(12) United States Patent
van Poppel

(10) Patent No.: US 12,263,807 B2
(45) Date of Patent: Apr. 1, 2025

(54) ADAPTIVE LOAD-LIMITING SEATBELT ASSEMBLY

(71) Applicant: Jean Alain van Poppel, Shenandoah, TX (US)

(72) Inventor: Jean Alain van Poppel, Shenandoah, TX (US)

( * ) Notice: Subject to any disclaimer, the term of this patent is extended or adjusted under 35 U.S.C. 154(b) by 291 days.

(21) Appl. No.: 18/078,043

(22) Filed: Dec. 8, 2022

(65) Prior Publication Data
US 2024/0270201 A1  Aug. 15, 2024

(51) Int. Cl.
*B60R 22/343* (2006.01)
*B60R 22/48* (2006.01)

(52) U.S. Cl.
CPC ............ *B60R 22/343* (2013.01); *B60R 22/48* (2013.01)

(58) Field of Classification Search
CPC ........ B60R 2022/285; B60R 2022/284; B60R 2022/282; B60R 22/28; B60R 2022/468
See application file for complete search history.

(56) References Cited

U.S. PATENT DOCUMENTS

| | | | |
|---|---|---|---|
| 4,729,525 | A | 3/1988 | Rumpf |
| 4,895,317 | A | 1/1990 | Rumpf et al. |
| 5,547,143 | A | 8/1996 | Miller, III et al. |
| 6,216,973 | B1 | 4/2001 | Bauer |
| 6,384,518 | B1 | 5/2002 | van Poppel |
| 7,318,560 | B2 | 1/2008 | Clute |
| 7,392,957 | B2 | 7/2008 | Hiramatsu |
| 7,478,836 | B2 * | 1/2009 | Lenning ............ B60R 21/01558 280/805 |
| 7,631,830 | B2 | 12/2009 | Boelstler et al. |
| 7,669,794 | B2 | 3/2010 | Boelstler et al. |

(Continued)

FOREIGN PATENT DOCUMENTS

| | | | | |
|---|---|---|---|---|
| CN | 11873866 | A | 11/2020 | |
| CN | 116323338 | A * | 6/2023 | ............. B60R 22/44 |

(Continued)

OTHER PUBLICATIONS

Van Poppel, J.A., Rath Stern, A., Fortenbaugh, D., Wilcox, G, "A Parametric Study of an Adaptive Load—Limiting Restraint System with Weight Sensing Considerations", presented Jun. 12, 2019 at the 2019 ESV International Technical Conference, Eindhoven, Netherlands, Jun. 10-13, 2019 and made available to the public sometime after the end of the conference, 22 pages.

(Continued)

*Primary Examiner* — Sang K Kim
*Assistant Examiner* — Ermia E. Melika
(74) *Attorney, Agent, or Firm* — Hooker & Habib, P.C.

(57) ABSTRACT

An adaptive load-limiting seatbelt assembly for a passenger vehicle includes a rotatable spool drum storing a length of seatbelt webbing and a piezoelectric device defining an interference fit between a pair of members of the piezoelectric device. The spool drum is operatively disconnected from the piezoelectric device during normal operation of the seatbelt assembly to permit free rotation of the spool drum and is operatively connected to the piezoelectric device during a dynamic event such as a vehicle crash so that the interference fit resists rotation of the spool drum in the pay-out direction to dynamically or statically control pay-out of the seatbelt webbing during the dynamic event.

21 Claims, 15 Drawing Sheets

(56) References Cited

U.S. PATENT DOCUMENTS

| | | |
|---|---|---|
| 7,806,357 B2 | 10/2010 | Clute |
| 8,116,948 B2 | 2/2012 | Lenning |
| 9,611,902 B2* | 4/2017 | Nuding .................. F16D 41/12 |
| 9,650,015 B2 | 5/2017 | Specht et al. |
| 10,399,540 B2 | 9/2019 | Gray |
| 2002/0113424 A1 | 8/2002 | Smith, Jr. et al. |
| 2006/0082127 A1 | 4/2006 | Clute |
| 2006/0208125 A1* | 9/2006 | Holbein .................. B60R 22/46 |
| | | 242/374 |
| 2006/0255583 A1 | 11/2006 | Lenning (Ingemarsson) |
| 2007/0228204 A1 | 10/2007 | Lenning |
| 2009/0005935 A1 | 1/2009 | Lenning |
| 2009/0057470 A1 | 3/2009 | Hiramatsu et al. |
| 2015/0122931 A1 | 5/2015 | Specht et al. |
| 2020/0216016 A1 | 7/2020 | Schlaps et al. |
| 2020/0307507 A1 | 10/2020 | Jaradi et al. |
| 2021/0380068 A1* | 12/2021 | van Poppel ........... B60R 22/343 |

FOREIGN PATENT DOCUMENTS

| | | | |
|---|---|---|---|
| DE | 102007001102 A1 * | 7/2008 | ......... B60R 22/3413 |
| DE | 102011101517 A1 | 11/2012 | |
| EP | 2743146 A1 * | 6/2014 | ........... B60R 22/341 |
| GB | 2420610 A | 5/2006 | |
| JP | 2022154633 A * | 10/2022 | |
| WO | 2013132307 A1 | 9/2013 | |

OTHER PUBLICATIONS

European Patent Office, English-language machine translation of specification and claims of CN111873866A, downloaded Jun. 9, 2022, 30 pages.

European Patent Office, English-language machine translation of specification and claims of DE102011101517A1 downloaded Jun. 9, 2022, 13 pages.

\* cited by examiner

ADAPTIVE LOAD-LIMITING SEATBELT ASSEMBLY

FIELD OF THE DISCLOSURE

The disclosure relates generally to seatbelt assemblies for passenger vehicles, and more particularly, to a seatbelt assembly that adaptively apportions seatbelt forces applied to a vehicle occupant during a crash.

BACKGROUND OF THE DISCLOSURE

Vehicle seatbelt assemblies protect vehicle occupants in the event of a dynamic event such as a crash or other substantial vehicle deceleration event. For front seat occupants, the seatbelt assemblies may work in conjunction with air bags for occupant protection.

Typical seatbelt assemblies for passenger vehicles include a seatbelt having a retractor generally configured as a spool drum that can rotate about an axis. The spool drum is supported in a frame attached to the passenger vehicle body or vehicle frame. The frame may define a pair of support elements that rotatably support the spool drum. Seatbelt webbing is looped around the spool drum. Sufficient length of webbing is looped around the spool drum to accommodate seatbelt webbing pay-out for a vehicle occupant at least as large as a 95th percentile male.

The seatbelt assembly is further complemented with a locking mechanism that locks the spool drum during the dynamic event. The spool drum is quickly locked to prevent free rotation of the spool drum. The spool drum cannot pay-out the seatbelt webbing and the occupant is restrained by the seatbelt webbing during the dynamic event.

Seatbelt assemblies are also commonly equipped with a pretensioner that can rotate the spool drum in a direction opposite to the seatbelt webbing pay-out direction of rotation. The pretensioner quickly tightens the seatbelt webbing against an occupant. Pre-tensioning enables the seatbelt webbing to restrain the occupant more quickly at the start of the dynamic event.

During the dynamic event, the occupant loads the seatbelt webbing, and in return the seatbelt webbing applies force to the occupant. Without any additional technology the seatbelt webbing typically stretches somewhat from occupant loading (typically at most one to three inches).

Seatbelt assemblies are commonly equipped with a load limiting system to lower peak seatbelt webbing forces applied to the occupant. The load limiting system acts to effectively add additional seatbelt webbing pay-out in addition to the inherent stretch of the seatbelt webbing under load.

My U.S. patent application Ser. No. 17/336,783 (published as Patent Application Publication 2021/0380068 A1 and incorporated by reference as if fully set forth herein) discloses an adaptive load-limiting seatbelt assembly that utilizes a Tailored Control Joint (TCJ) that dynamically controls seatbelt forces and pay-out of the seatbelt during a dynamic event. A TCJ is a piezoelectric device (a device containing an active member made of a piezoelectric material) that combines electrical and mechanical components that control pay-out of a seatbelt through a control system during a dynamic event. The TCJ advantageously enables the seatbelt assembly to adapt and apportion peak seatbelt force applied to an occupant. The TCJ electrically controls an interference fit between members that controls the resistance of spool drum pay-out of the seatbelt during the dynamic event.

Principles of operation of possible embodiments of a TCJ are also disclosed in my U.S. Pat. No. 6,384,518 which is also incorporated by reference as if fully set forth herein.

In many seatbelt assembly applications, the occupant should be able to freely take in and pay out seatbelt webbing during normal operating conditions of the seatbelt assembly outside of a dynamic event. The spool drum should be essentially free to rotate during normal operating conditions, enabling the occupant to fasten and unfasten the seatbelt and comfortably move about while wearing the seatbelt.

It is hoped that a user does not experience a dynamic event during the lifetime of a seatbelt assembly and that the seatbelt assembly experiences only normal operating conditions. But if a dynamic event should ever occur, the seatbelt assembly performs its safety function restraining the occupant and limiting injury as much as possible.

The adaptive load-limiting seatbelt assemblies disclosed in my '783 application incorporate a permanent non-rotatable connection between the spool drum and the TCJ. If the spool drum is to be free to rotate to enable an occupant to freely take in and pay-out seatbelt webbing during normal operation of the seatbelt assembly, the interference fit of the TCJ must be zero or substantially near zero to enable the occupant to take in and pay out seatbelt webbing during normal operating conditions.

In one disclosed embodiment seatbelt assembly, the TCJ when unpowered has an initial relatively high interference fit. In this embodiment a voltage is applied to the TCJ during normal operating conditions to reduce the interference fit sufficiently to enable an occupant to withdraw seatbelt webbing during normal use of the seatbelt assembly. That is, the seatbelt assembly being always operatively connected to the TCJ must rely on the TCJ controlling the interference fit to enable rotation of the spool drum during normal operation and use of the seatbelt assembly.

It would be useful if the TCJ could maintain a normally high interference fit during normal operating conditions of the seatbelt assembly while still allowing the spool drum to be essentially free to rotate. The occupant can then freely take in or pay out seatbelt webbing even while the TCJ maintains a high interference fit during normal operating conditions.

SUMMARY OF THE DISCLOSURE

Disclosed are adaptive load-limiting seatbelt assemblies that, in accordance with this disclosure, utilize a TCJ to control pay-out of the seatbelt webbing during a dynamic event but enable the TCJ to maintain a relatively high interference fit while still enabling the occupant to freely take in or pay out seatbelt webbing during normal operating conditions of the seatbelt assembly.

The TCJ includes a radially inner member and a radially outer member mounted along a common axis, one of the members being made of a piezoelectric material. The TCJ controls a voltage applied to the piezoelectric material that regulates an interference fit between the inner and outer members. The TCJ members have facing concentric bearing surfaces that define the interference fit between them that resists relative rotation of the two members during the dynamic event.

During a dynamic event, occupant loading of the seatbelt webbing urges rotation of the spool drum. During the dynamic event the spool drum is non-rotatably connected to one of the inner and outer members and urges rotation of the one, rotatable member. Rotation of the one member is resisted by the interference fit with the other member of the TCJ which, during the dynamic event, is a stationary member fixed with respect to the spool drum and the rotatable member of the TCJ (that is, the "stationary member" of the TCJ is so-called because it is fixed and stationary with respect to the frame during a dynamic event, although in some embodiments of the disclosed seatbelt assembly the stationary member is free to rotate during normal operation of the seatbelt assembly outside of a dynamic event).

The TCJ in possible embodiments of the disclosed seatbelt assembly is connected to a controller that regulates and varies the voltage applied to the piezoelectric material as necessary to dynamically control relative rotation of the rotatable member with respect to the stationary member and thereby control pay-out of seatbelt webbing during the dynamic event. In other possible embodiments of the disclosed seatbelt assembly, the controller is omitted and the initial interference fit between the members of the TCJ is relied on to statically y control pay-out of the seatbelt webbing during the dynamic event.

In first embodiments of the seatbelt assembly in accordance with this disclosure the spool and the inner and outer members of the TCJ are each a separate member from the other members. During normal operating conditions, the spool drum is operatively disconnected from the TCJ. By "operatively disconnected" is meant rotation of the spool drum is effectively unaffected by and not resisted by a positive interference fit between the members of the TCJ that would otherwise impede spool drum rotation. The spool drum is free to rotate to take in or pay out seatbelt webbing during normal operating conditions of the seatbelt assembly independently of the interference fit.

Upon initiation of a dynamic event, the spool drum is non-rotatably connected to the rotatable member of the TCJ. The interference fit between the members of the TCJ resists rotation of the spool drum and enables the TCJ to now regulate pay-out of seatbelt webbing during the dynamic event as previously described.

The spool drum in possible first embodiments is not connected to the TCJ during normal operating conditions of the seatbelt assembly. The spool drum is free to rotate independently of the TCJ during normal operating conditions and so can without resistance from the interference fit between the TCJ members. Upon initiation of a dynamic event, the spool drum becomes non-rotatably connected to the rotatable member of the TCJ in the pay-out direction of rotation of the spool drum. The interference fit between the members of the TCJ resists rotation of the spool drum and enables the TCJ to now regulate pay-out of seatbelt webbing during the dynamic event In possible first embodiments in which the spool drum is not connected to the TCJ during normal operating conditions, a rotary clutch is operatively disposed between the spool drum and the rotatable member of the TCJ. The rotary clutch has a first member non-rotatably connected to the spool drum and a second member non-rotatably connected to the rotatable member of the TCJ. The members of the rotary clutch are disengaged from one another during normal operating conditions and so the spool drum is free to rotate independently of the TCJ.

In response to the dynamic event, rotation of the spool drum in the pay-out direction causes the first clutch member to engage the second clutch member, thereby non-rotatably connecting the spool drum with the rotatable member of the TCJ.

The spool drum, in yet other possible first embodiments, is non-rotatably connected to the rotatable member of the TCJ during normal operating conditions. The stationary member is also supported as a rotatable member with respect to the frame during normal operating conditions (the term "stationary member" referring to the member being fixed to the frame during the dynamic event). The interference fit between the two members of the TCJ force conjoint rotation of the stationary member with the rotatable member with rotation of the spool drum. Because the spool drum can now rotate conjointly with the TCJ, the spool drum is free to rotate during normal operating conditions without resistance from the interference fit between the two members. The spool drum is effectively operatively disconnected from the TCJ because the spool drum can rotate independently of any interference fit.

In response to initiation of a dynamic event, the stationary member of the TCJ is non-rotatably connected to the frame. The stationary member becomes stationary with respect to the frame and cannot rotate with respect to the spool drum or rotatable member of the TCJ.

In possible first embodiments in which the spool drum is non-rotatably connected to the rotatable member of the TCJ during normal operating conditions, a rotary clutch is operatively disposed between the stationary member of the TCJ and the frame. The rotary clutch has a first member non-rotatably connected to the stationary member and a second member non-rotatably connected to the frame. The members of the rotary clutch are disengaged from one another during normal operating conditions and so the spool drum is free to rotate independently of the TCJ.

In response to the dynamic event, rotation of the spool drum in the pay-out direction engages the first clutch member with the second clutch member, thereby non-rotatably connecting the stationary member of the TCJ to the frame.

In other possible embodiments of the first embodiments in which the spool drum is non-rotatably connected to the rotatable member of the TCJ during normal operating conditions, the stationary member becomes non-rotatably connected to the frame by an inertial locking assembly. The inertial locking assembly includes an inertia responsive to forces or rotation initiated by the dynamic event. The inertia member causes the stationary member of the TCJ to be non-rotatably connected to frame.

In second embodiments of the seatbelt assembly in accordance with this disclosure the spool drum forms at least a portion of the outer member of the TCJ and is the rotatable member of the TCJ. The interference fit between the inner member of the TCJ and the spool drum resists relative rotation of the spool drum during the dynamic event and enables the TCJ to regulate pay-out of seatbelt webbing during the dynamic event.

The stationary member of the TCJ is supported as a rotatable member with respect to the frame during normal operating conditions. The interference fit between the spool drum and the stationary member force conjoint rotation of the stationary member with the spool drum with rotation of the spool drum. Because the spool drum rotates conjointly with the stationary member, the spool drum is free to rotate during normal operating conditions without resistance from the interference fit between the spool drum and the TCJ.

In response to rotation of the spool drum in the pay-out direction upon initiation of a dynamic event, the stationary member of the TCJ can be non-rotatably connected to the frame in possible second embodiments by either a rotary clutch or an inertial locking mechanism as previously described with respect to possible first embodiment seatbelt assemblies in which the spool drum is normally non-rotatably connected to the rotatable member of the TCJ.

Embodiments of seatbelt assemblies in accordance with this disclosure may omit the controller and rely on the initial interference fit between the two members to statically control pay-out of the seatbelt webbing during the dynamic event. The initial interference fit of a seatbelt assembly used for normal operating conditions without a control system may differ from the initial interference fit used in conjunction with a control system depending on the performance requirements of the application environment.

Embodiments of the seatbelt assembly in accordance with this disclosure may include multiple locking mechanisms (for a non-limiting example, two different types of inertial locking mechanisms) for redundancy. Other types of rotary clutches, inertial locking mechanisms, and the like to form non-rotatable connections between the spool drum and the rotatable member of the TCJ and/or between the stationary member of the TCJ and the frame are known and can be incorporated in possible embodiments of the seatbelt assembly in accordance with this disclosure.

A rotary clutch includes a first clutch member and a second clutch member. A one-way rotary clutch can be used in possible embodiments of the disclosed seatbelt assembly. A one-way rotary clutch is designed to engage and transmit torque from the first clutch member to the second clutch member when the first clutch member is rotating in a first direction of rotation, but is designed not to engage and transfer torque from the first clutch member to the second clutch member when the first clutch member is rotating in the opposite second direction of rotation.

The rotary clutch is in a disengaged state when the first clutch member is not engaged with and not transmitting torque to the second clutch member. The rotary clutch is in an engaged state when the first clutch member is engaged with and transmitting torque to the second clutch member.

A rotary clutch that can be used in possible embodiments of the disclosed seatbelt assembly can be configured to switch from the disengaged state to the engaged state upon rotation of the first clutch member above a threshold rate of rotation or above a threshold rate of angular acceleration.

The disclosed seatbelt assembly enables the TCJ to have a large initial interference fit already in place before a dynamic event occurs. The initial interference fit can be the interference fit generated between the TCJ members when no voltage is applied to the piezoelectric material, thus saving energy and assuring the presence of substantial resistance to seatbelt pay-out immediately at the start of pay-out.

Seatbelt assemblies in accordance with this disclosure enable dynamic or static control of seatbelt webbing pay-out utilizing a relatively large interference fit that is present during normal operation of the seatbelt but does not interfere with normal operation of the seatbelt. The seatbelt assembly can immediately act to resist pay-out of the spool drum at initiation of the dynamic event.

Embodiments of the seatbelt assembly may also include a pretensioner that drive the spool drum in the retraction direction at the start of the dynamic event. The interference fit of the TCJ does not affect operation of the pretensioner.

Other objects and features of the disclosure will become apparent as the description proceeds, especially when taken in conjunction with the accompanying drawing sheets illustrating one or more illustrative embodiments.

DETAILED DESCRIPTION

Figure 1:
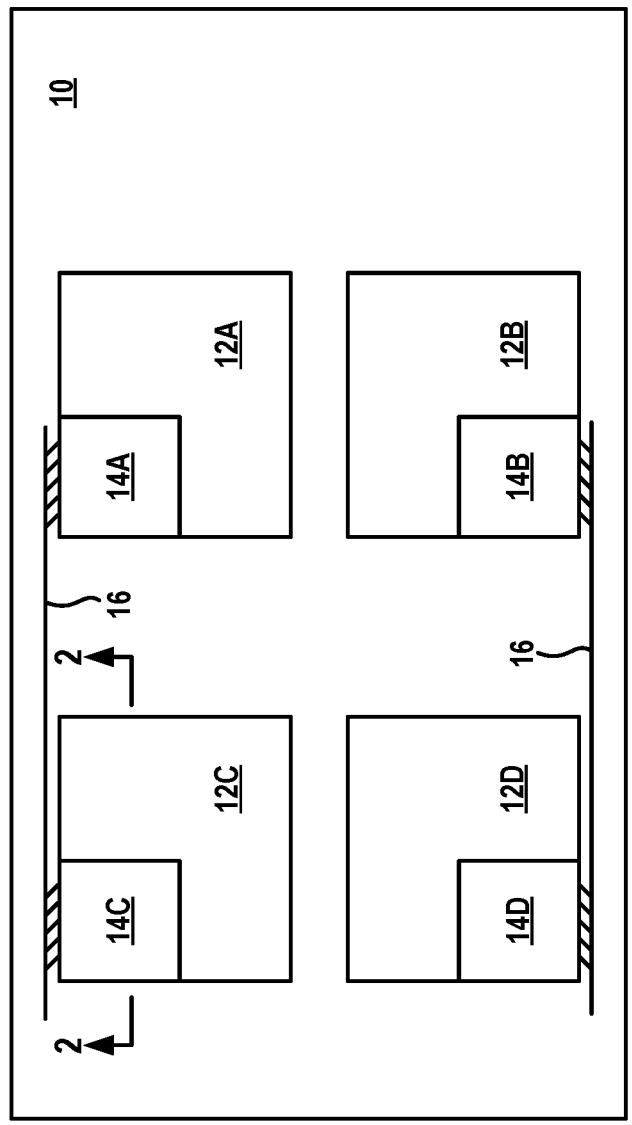
FIG. 1 is a schematic view of a passenger vehicle employing first embodiment adaptive load-limiting seatbelt assemblies in accordance with this disclosure.
Figure 2:
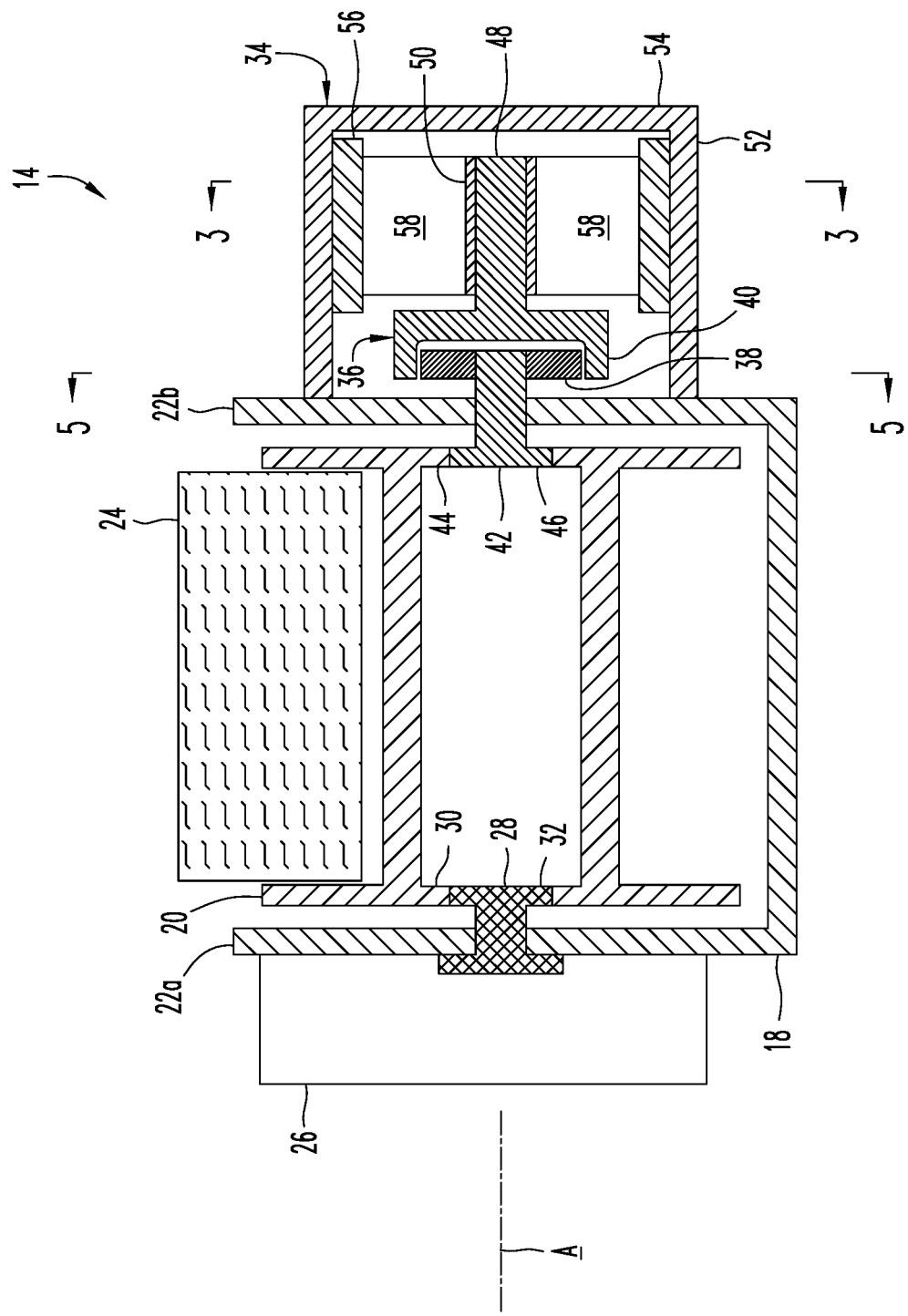
FIG. 2 is a vertical sectional view of one of the seatbelt assemblies shown in FIG. 1 taken through line 2-2 of FIG. 1.

FIG. 1 schematically illustrates a non-limiting passenger vehicle 10, which may be a type of automobile, truck, agricultural vehicle, airplane, or other type of powered or non-powered vehicle (for example, a glider) in which it is desired or required to have seatbelt occupant restraints. The vehicle may be a manually driven vehicle or may be an autonomous vehicle. The interior of the illustrated vehicle 10 has four occupant seating positions 12. Seating positions 12A and 12B are front-seat seating positions and seating positions 12C and 12D are rear-seat seating positions.

Each seating position 12 is provided with a respective first embodiment adaptive load-limiting seatbelt assembly 14 for use by an occupant in the seating position. The seatbelt assemblies 14 are fixedly attached to the vehicle frame or body 16. Applicable law may require that each seatbelt assembly 14 be a three-point seatbelt that forms a lap belt and shoulder belt for each occupant.

Figure 4:
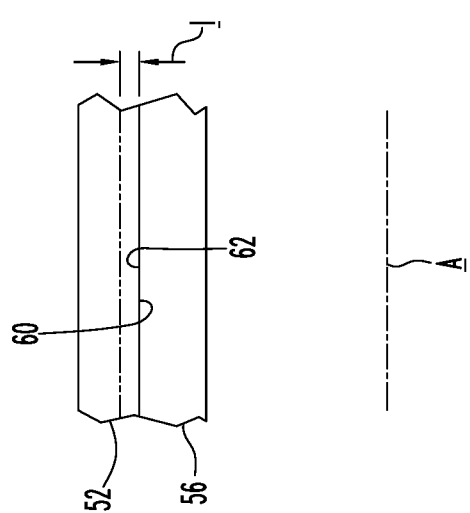
FIG. 4 illustrates generation of the interference fit by the TCJ of the seatbelt assembly shown in FIG. 2.
Figure 3:
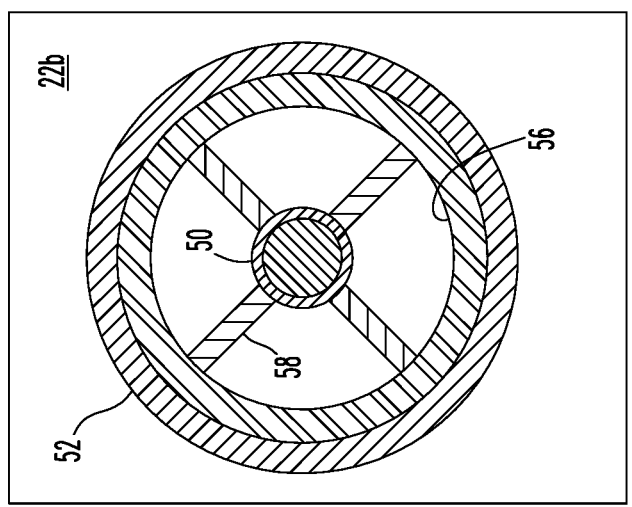
FIG. 3 is a vertical section view of the seatbelt assembly shown in FIG. 2 taken through line 3-3 of FIG. 2.
Figure 5:
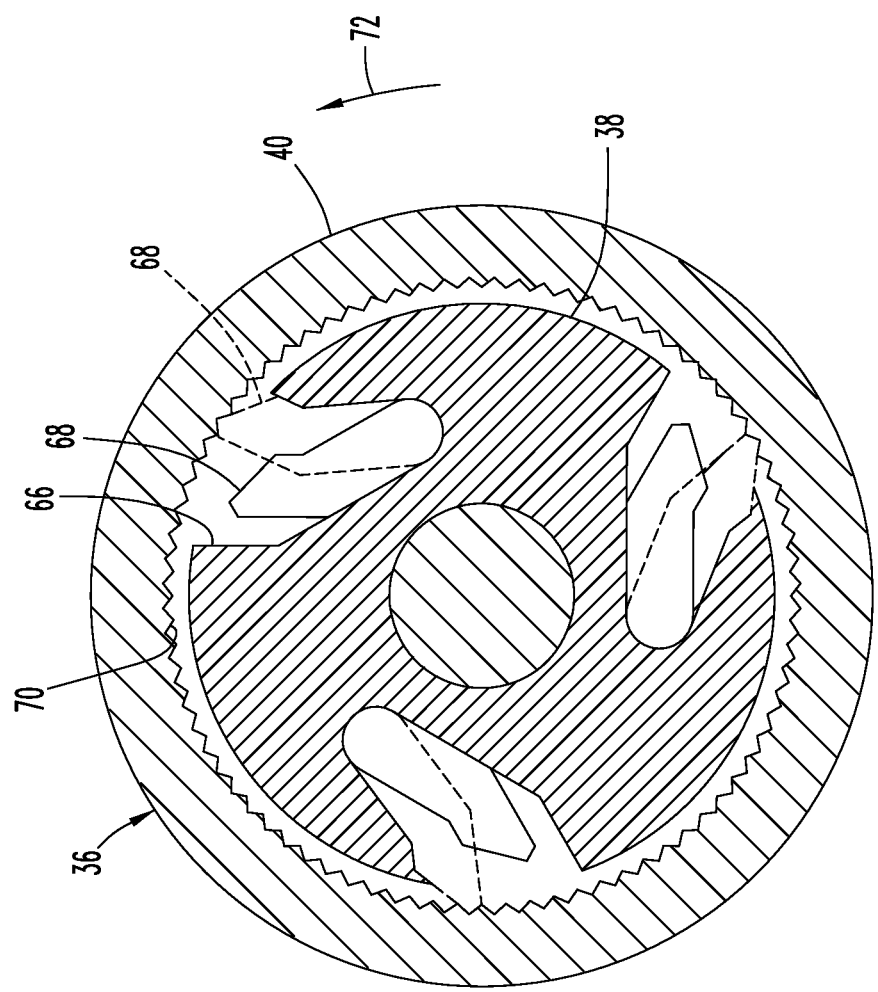
FIG. 5 is a sectional view of the seatbelt assembly shown in FIG. 2 taken along line 5-5 of FIG. 2.
Figure 6:
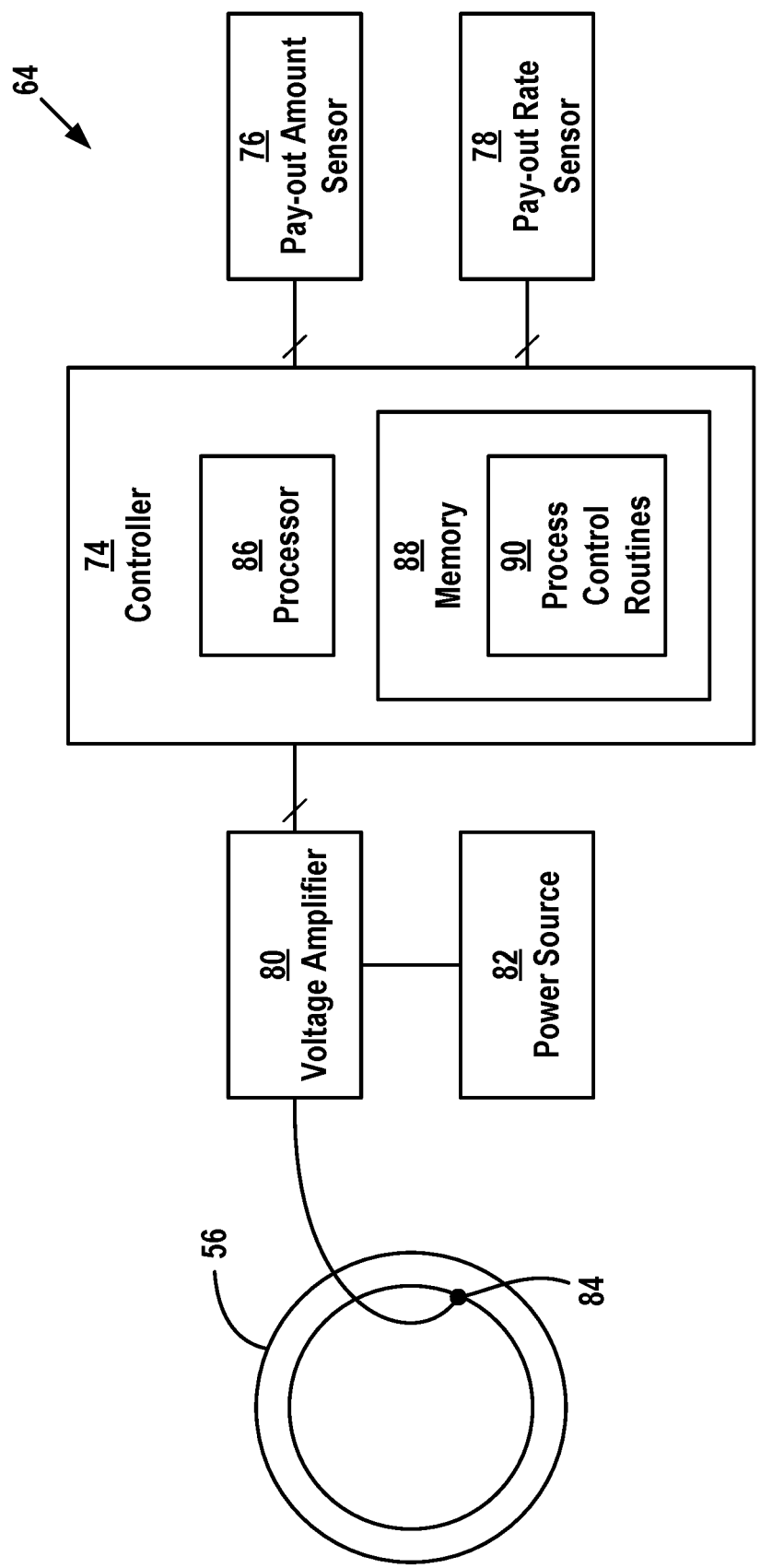
FIG. 6 is a schematic diagram of the control system of the TCJ of the seatbelt assembly shown in FIG. 2.
Figure 7:
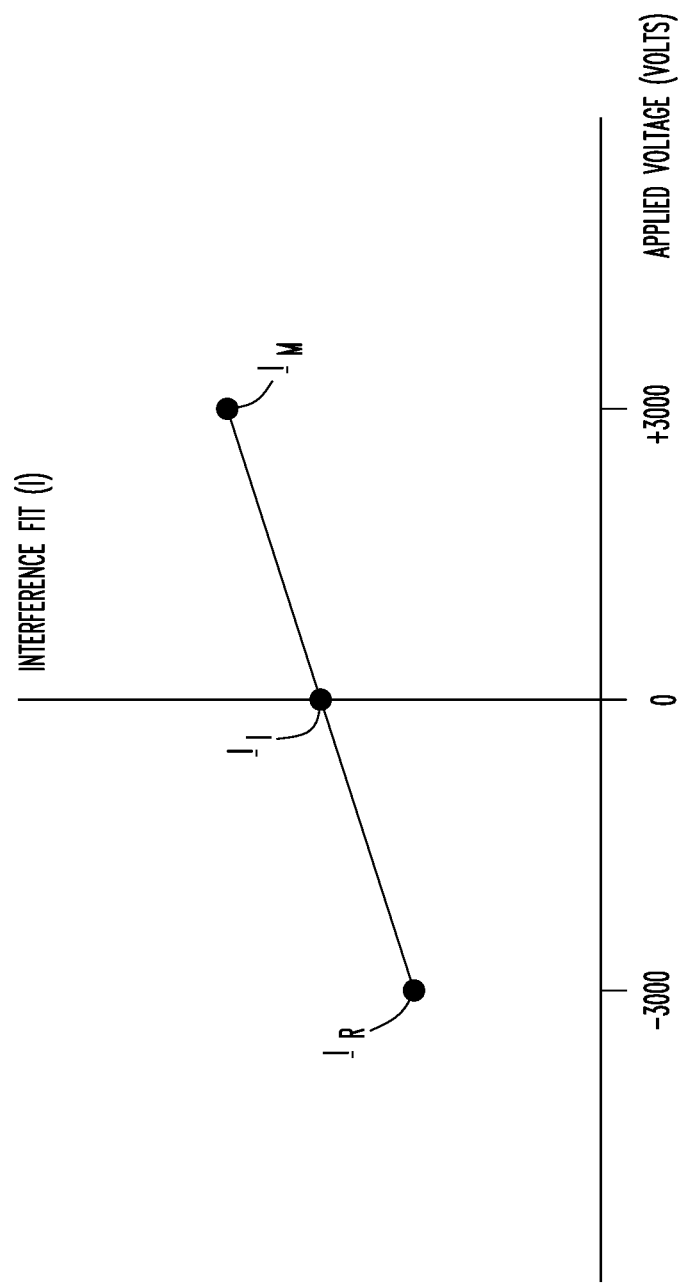
FIG. 7 is a graph illustrating radial interference fit versus applied voltage applied by the control system to the piezoelectric member of the TCJ of the seatbelt assembly shown in FIG. 2.

FIGS. 2-5 illustrate the mechanical components of the first embodiment seatbelt assembly 14, and FIGS. 6 and 7 schematically illustrate the control system and operation of the control system of the seatbelt assembly 14.

The seatbelt assembly 14 includes a frame 18 that is rigidly fastened to the vehicle frame or vehicle body 16. The seatbelt assembly includes a retractor assembly that includes a spool drum 20 located between a pair of spaced apart sidewalls 22a, 22b of the frame 18. The spool drum 20 stores a length of seatbelt webbing represented as fabric patch 24. The spool drum 20 rotates about an axis of rotation A in a pay-out direction to pay-out seatbelt webbing and rotates in an opposite retraction direction to take in seatbelt webbing.

Attached to the outside of the sidewall 22a is a pretensioner 26. The pretensioner 26 is operatively connected to the spool drum 20 by a first end of a first shaft 28 rotatably mounted in the sidewall 22a coaxial with the rotational axis A. The shaft 28 is formed as a stub shaft connected to the pretensioner 26, the connection of the first end of the stub shaft 28 to the pretensioner 26 represented by the radially enlarged first end of the stub shaft 28.

The illustrated pretensioner 26 is operatively disconnected from the stub shaft 28 during normal day-to-day operation of the seatbelt assembly 14.

The second end of the stub shaft 28 is non-rotatably connected to the spool drum 20 at the cooperating spool drum and stub shaft flanges 30, 32 inside the frame 18 and adjacent to the frame sidewall 22a. The cooperating flanges 30, 32 form a splined or keyed connection whereby rotation of the stub shaft 28 urges rotation of the spool drum 20.

Attached to the outside of the sidewall 22b is a Tailored Control Joint (TCJ) 34. The TCJ 34 is operably connectable to the spool drum 20 through a one-way rotary clutch 36. The clutch 36 includes a first, inner, clutch member 38 surrounded by a concentric second, outer, clutch member 40.

The inner clutch member 38 is non-rotatably connected to the spool drum 20 by being fixedly mounted on a shaft 42 rotatably mounted in the sidewall 22b coaxial with the rotational axis A. The shaft 42 is non-rotatably connected to the spool drum 20 at the cooperating spool drum and shaft flanges 44, 46 inside the frame 18 and adjacent to the frame sidewall 22b. The cooperating flanges 44, 46 form a splined or keyed connection whereby rotation of the spool drum 20 urges rotation of the shaft 42.

The outer clutch member 40 is non-rotatably connected to the TCJ 34 by a shaft 48 integrally formed with the outer clutch member. The shaft 48 is coaxial with the rotational axis A. The shaft 48 extends to the TCJ 34 and is non-rotatably received in a tubular sleeve 50 of the TCJ using a splined or keyed connection whereby rotation of the outer clutch member 40 urges rotation of the TCJ sleeve 50.

The TCJ 34 includes a cylindrical housing 52 fixedly attached to the sidewall 22b and closed by an end wall 54. Closely received in the housing 52 is a cylindrical ring 56 made of piezoelectric material. The housing 52 and the piezoelectric ring 56 are both concentric with the rotational axis A. The outer clutch member shaft 48 extends into the housing 52 but ends before reaching the housing end wall 54.

The piezoelectric ring 56 is fixedly attached to the sleeve 50 by a multi-vaned spider having circumferentially spaced and radially extending vanes 58 fixedly connected to the inner wall of the piezoelectric ring 56, thereby non-rotatably connecting the piezoelectric ring 56 with the outer clutch member 40.

FIG. 4 illustrates generation of the interference fit I between the housing 52 and the piezoelectric ring 56 of the TCJ 34. The housing 52 has an annular inner bearing surface 60 closely surrounding an annular outer bearing surface 62 of the piezoelectric ring 56. The unstressed outer diameter of the ring bearing surface 56 is dynamically controlled by the TCJ control system 64 (see FIG. 6) as will be described in more detail below and as disclosed in my U.S. Pat. No. 6,384,518. Through operation of the control system 64, the bearing surfaces 60, 62 cooperatively define a controllable radial interference fit I between them that generates a friction force resisting or even preventing relative rotation of the TCJ piezoelectric ring 56 relative to the TCJ housing 52.

FIG. 5 is a cross-sectional view of the one-way rotary clutch 36. The clutch 36 is adapted from the one-way rotatory clutch disclosed in Boelstler et al. U.S. Pat. No. 7,631,830, incorporated by reference as if fully set forth herein. Other one-way rotary clutch designs are known in the mechanical arts that can be adapted for use with seat belt assemblies in accordance with this disclosure. Rotary clutches are designed to respond to rotational speed or to angular acceleration in switching from a disengaged state to an engaged state.

The inner clutch member 38 includes a number of like angularly symmetrically spaced apart pockets 66 disposed about the outer circumference of the clutch member. Like pawls 68 are pivotally mounted in the pockets 66.

The pawls 68 are drawn in solid lines in FIG. 5 to illustrate the disengaged state of the clutch 36. The pawls 68 do not extend out of the pockets 66. The inner clutch member 38 is free to rotate about the axis A without interference from the outer clutch member 36.

The pawls 68 are drawn in broken lines in FIG. 5 to illustrate the engaged state of the clutch 36. Rotation of the inner clutch member 38 above a threshold rotation speed or angular acceleration causes the pawls 68 to extend out of the pockets 66 and engage against teeth 70 spaced along the inner wall of the outer clutch member 40 surrounding and facing the inner clutch member 38. The pawls 68 are designed such that rotation of the inner clutch member 38 in the pay-out direction 72 of the spool drum 20 causes the pawls 68 to form a non-rotatable connection between the inner clutch member 38 and the outer clutch member 40, forming thereby a non-rotatable connection between the spool drum 20 and the TCJ 34.

Rotation of the inner clutch member 38 in the opposite retraction direction of the spool drum 20 can cause the pawls 68 to extend out of the pockets and move against the teeth 70. The pawls 68, however, are designed to not form a non-rotatable connection between the inner clutch member 38 and the outer clutch member 40 when the inner clutch member is rotating in the retraction direction of the spool drum opposite to the pay-out direction 72. The inner clutch member rotates with negligible transfer of torque to the outer clutch member when rotating in the retraction direction.

The threshold rotational speed or angular acceleration of the inner clutch member 38 to switch the clutch 36 from its disengaged state to its engaged state is selected such that the clutch is in its disengaged state for normal use of the seatbelt assembly. In effect, the spool drum 20 is operatively disconnected from the TCJ 34 during normal use of the seatbelt assembly regardless of the state of the interference fit of the TCJ 34.

Operation of the seatbelt assembly 14 and its control system 64 upon initiation of a dynamic event is described next.

The pretensioner 26 operates in milliseconds (perhaps, for example, in response to an actuation signal generated by an air bag system) to rotate the spool drum 20 in the retraction direction and tighten the seatbelt against the occupant. The TCJ 34 remains operatively disconnected from the spool drum 20 during operation of the pretensioner 26 in rotating the spool drum 20 in the retraction direction and thereby tightening the seatbelt webbing against the occupant.

After the pretensioner 26 tightens the seatbelt, the pretensioner effectively disconnects from the spool drum 20 and does not prevent rotation of the spool drum in the pay-out direction.

Deceleration of the vehicle caused by the dynamic event moves the occupant forward relative to the vehicle frame or body 16 and against the tightened seatbelt worn by the occupant. Seatbelt webbing attempts to unspool from the spool drum 20, urging the spool drum 20 to rotate in the pay-out direction. The spool drum 20 rotates the inner clutch member 38 in the pay-out direction, the rotational speed or angular acceleration of the inner clutch member being beyond the threshold and causing the clutch 36 to switch to its engaged state and thereby non-rotatably connecting the spool drum 20 to the TCJ 34. The spool drum 20 now urges rotation of the piezoelectric ring 56 against the housing 52.

The control system 64 recognizes the dynamic event by the sudden high rate of seatbelt webbing pay-out or in response to a signal (from an airbag deployment system for example) indicating the start of a dynamic event. The control system controls the interference fit $I$ between the TCJ bearing surfaces 60, 62 and thereby controls the frictional force between the bearing surfaces resisting relative rotation of the piezoelectric ring 56 with the housing 52 during the forceful dynamic event. The frictional force thereby also acts through the non-rotatable connection between the piezoelectric ring 56 and the spool drum 20 to resist rotation of the spool drum 20. The TCJ 34 now operates with the clutch 36 in its engaged state to effectively control rotation of the spool drum 20, and therefore control the pay-out of the seatbelt webbing from the spool drum 20 and the resulting tension force in the seatbelt webbing during the dynamic event.

The illustrated TCJ control system 64 provides an initial, relatively large interference fit between the housing 52 and the piezoelectric ring 56 with no voltage applied to the piezoelectric ring. This initial interference fit defines an initial resistance to rotation of the spool drum 20 when the clutch 36 switches to its engaged state. The interference fit can then be modulated (increased, decreased, or staying the same) for controlled pay-out of the seatbelt from the spool drum 20 to increase, decrease, or maintain the rate of pay-out during the dynamic event and resulting control of the force applied to the occupant by the seatbelt assembly.

The control system 64 reacts to pay-out of the seatbelt to increase, decrease, or maintain the interference fit $I$ to adaptively limit the seat belt force applied to the occupant during the dynamic event. A heavier occupant would generate a relatively high rate of seatbelt pay-out while a lighter occupant would generate a relatively low rate of seatbelt pay-out. The control system dynamically regulates the interference fit as necessary to control the rate of pay-out and total pay-out of the seatbelt during the dynamic events. Greater pay-out may be allowed for different seating positions; for example, front-seat seatbelt assemblies 14A, 14B may permit greater seatbelt pay-out than would rear-seat seatbelt assemblies 14C, 14D. Applicable law may limit the maximum seatbelt pay-out; the control system 64 in possible embodiments may sufficiently increase the interference fit to "lock" the spool drum 20 and prevent pay-out of the seatbelt past the amount allowed by law.

FIG. 6 schematically illustrates the control system 64. The control system 64 may be disposed entirely or partially inside the frame 18 of the seatbelt assembly 14 or in the housing 52. The housing may include wall openings or may include gaps between the housing and the frame sidewall 22b to pass wire (s) of the control system into or out of the housing.

The control system 64 includes a controller 74 that receives information from a first sensor 76 that transmits a data signal representing the pay-out amount of seatbelt from the spool drum 20 and a second sensor 78 that transmits a data signal representing the rate of seatbelt pay-out from the spool drum 20.

The controller 74 uses this information to transmit control signals to a voltage amplifier 80 connected to a power source or voltage source 82. The voltage amplifier 80 is electrically connected to the piezoelectric ring 56 by an electrical connection 84 that dynamically sets the voltage applied to the piezoelectric ring and thereby controls the instantaneous interference fit $I$ between the piezoelectric ring 56 and the housing 52.

The controller 74 includes a processor 86 operatively connected to a memory 88. The memory 88 stores process control routines 90 that are executed by the processor 86 using the data signals received from the first sensor 76 and the second sensor 78. The process control routines 90 calculate the desired voltage signal transmitted to the voltage amplifier 80.

Other embodiments of the control system 64 may use additional or different sensors. For example, the vehicle 10 may have a collision-avoidance system that automatically applies the brakes to prevent a collision. The avoidance system could signal the seatbelt assemblies 14 of a potential impending collision event so that each TCJ control system 64 can set a desired initial interference fit even before a dynamic event begins. As another example, each occupant seating location 12 is provided with a weight sensor that transmits a signal to the control system 64 representing the weight of the occupant. The occupant's weight may be used by the process control routines 90 to more customize the controlled pay-out of the seatbelt during a dynamic event. As yet another example, the control system 64 may receive an actuation signal generated by an airbag system or a collision detection system.

FIG. 7 illustrates a possible relationship between applied voltage (V) applied by the control system 64 and the interference fit $I$ generated between the piezoelectric ring 56 and the housing 52 for a representative embodiment of the TCJ 34. The torque required to overcome the friction generated between the piezoelectric ring and the housing resisting relative rotation therebetween is a function of factors that include the magnitude of the interference fit, the amount of surface area in contact with one another, and the effective radius at the interference fit.

In the illustrated embodiment, the control system 64 applies no voltage to the piezoelectric ring 56 during normal operation of the seatbelt assembly 14. The piezoelectric ring 56 and the housing 52 are configured to generate an initial interference fit $I_r$ when no voltage is applied to the piezoelectric ring. A seatbelt webbing tension of about 4,000 Newtons (about 900 pounds force) is then required to initiate pay-out of the seatbelt webbing. This is too much force to enable an occupant to withdraw seatbelt webbing during normal daily usage against the resistance generated by the interference fit. But as previously described the TCJ 34 is not connected to the spool drum 20 during normal operation of the seatbelt assembly 14, and so for normal daily usage the occupant is able to withdraw seatbelt webbing with effectively no resistance from the TCJ 34 despite the interference fit $I_r$.

Upon initiation of a dynamic event and the control system 64 starting to become active, the TCJ 34 starts with the initial interference fit $I_I$. The initial interference fit can be selected to provide a reasonable resistance to seatbelt pay-out (for example, substantially equivalent to the resistance provided by a torsion bar of conventional seatbelt assemblies) in the event power is lost to the TCJ 34.

The control system 64 then dynamically controls the interference fit between the piezoelectric ring 56 and the housing 52 within the possible operating range.

In the illustrated embodiment if the voltage is reduced to −3000 volts, the interference fit reduces to an interference fit $I_R$. This reduced interference fit requires a seatbelt webbing tension of about 2,000 Newtons (about 450 pounds force) for pay-out of the seatbelt webbing to occur. If the voltage is increased to +3000 volts, the interference fit increases to an interference fit $I_M$. This increased interference fit requires a seatbelt webbing tension of about 6,000 Newtons (about 1350 pounds force) for pay-out of the seatbelt webbing to occur.

Figure 8:
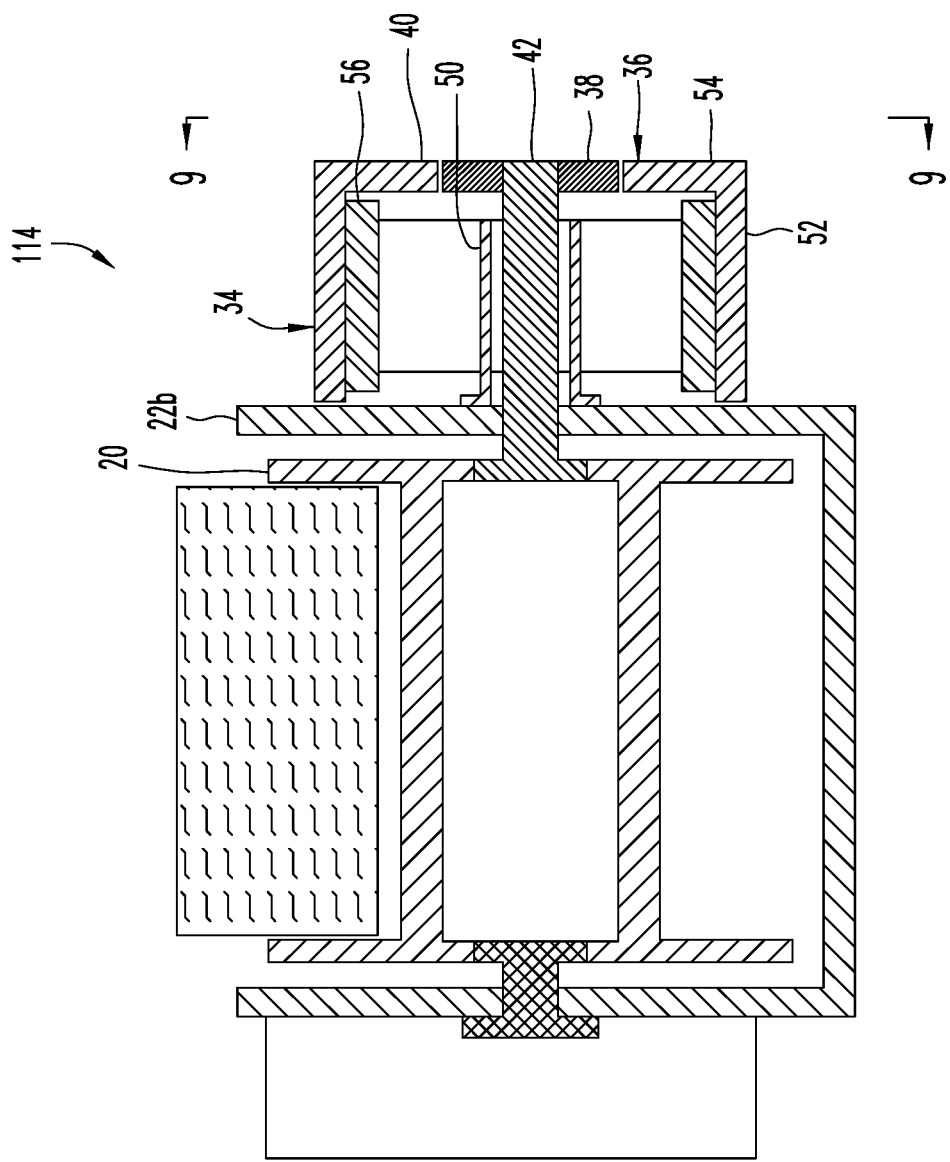
FIG. 8 is a vertical section view similar to FIG. 2 of a second embodiment adaptive load-limiting seatbelt assembly in accordance with this disclosure.
Figure 9:
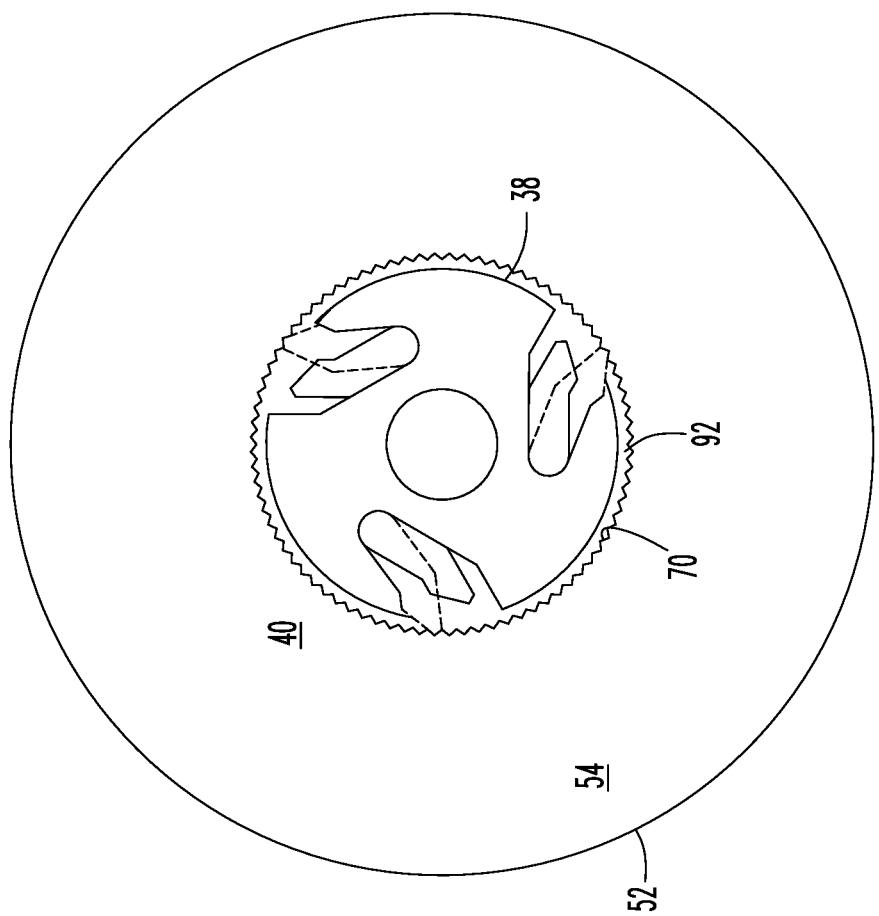
FIG. 9 is a side view of the seatbelt assembly shown in FIG. 8 taken along line 9-9 of FIG. 8.

FIGS. 8 and 9 illustrate a second embodiment adaptive seatbelt assembly 114 in accordance with this disclosure. Only the differences from the seatbelt assembly 14 will be described. The same reference numbers will be used for the same corresponding elements.

In this embodiment the housing 52 and the piezoelectric ring 56 of the TCJ 34 change roles as the fixed and movable members of the TCJ with respect to the frame sidewall 22b. The housing 52 is not fixedly attached to the frame sidewall 22b. The housing 52 is slightly spaced from the frame sidewall 22b by an air gap that enables relative rotation of the housing 52 about the axis A with respect to the sidewall.

The end wall 54 of the housing 52 does not close the housing but instead forms the outer clutch member 40. The teeth 70 of the outer clutch member 40 are formed on the annular wall of a central through-hole 92 extending through the end wall. The end wall non-rotatably connects the outer clutch member 40 to the TCJ 34 by being integral and formed with the tubular portion of the housing 52. The shaft 48 of the seatbelt assembly 14 extending from the outer clutch member 40 is eliminated. The shaft 42 connecting the spool drum 20 with the inner clutch member 38 extends from the spool drum through the sleeve 50 fixedly attached to the frame sidewall 22b. The shaft 42 can rotate with respect to the sleeve. The inner clutch member 38 is fixedly mounted on the free end of the shaft 42 concentric and surrounded by the outer clutch member 40. The piezoelectric ring 56 is fixedly attached to the sleeve 50 and is centered on the spool drum rotational axis.

The piezoelectric ring 56 forms an interference fit with the housing 52. The interference fit is sufficient to mount the housing 52 onto the piezoelectric ring and maintain the housing 52, including the outer clutch portion 40, centered on the spool drum rotational axis. The initial interference fit can be the same as the initial interference fit used in the seatbelt assembly 14.

The piezoelectric ring 56 is spaced from the frame sidewall 22b, thereby enabling the piezoelectric ring 56 to attempt to expand or contract radially without having to contact the sidewall. In other possible embodiments the piezoelectric ring 56 can be mounted directly on the frame sidewall 22b by interlocking teeth or other mechanical connection that allows radial expansion and contraction of the piezoelectric ring 56 relative to the sidewall.

During normal use of the seatbelt assembly 114, the clutch 36 is in the disengaged state. The spool drum 20 is not connected to the TCJ 34 and an occupant can freely extract seatbelt webbing.

A dynamic event causes the clutch 36 to switch from the disengaged state to the engaged state as previously described. The spool drum 20 is non-rotatably connected to the TCJ housing 52 and the belt loading urges relative rotation of the housing with respect to the piezoelectric ring 56. The interference fit can be controlled by the control system 64 as previously described for controlled pay-out of the seatbelt during the dynamic event.

Figure 10:
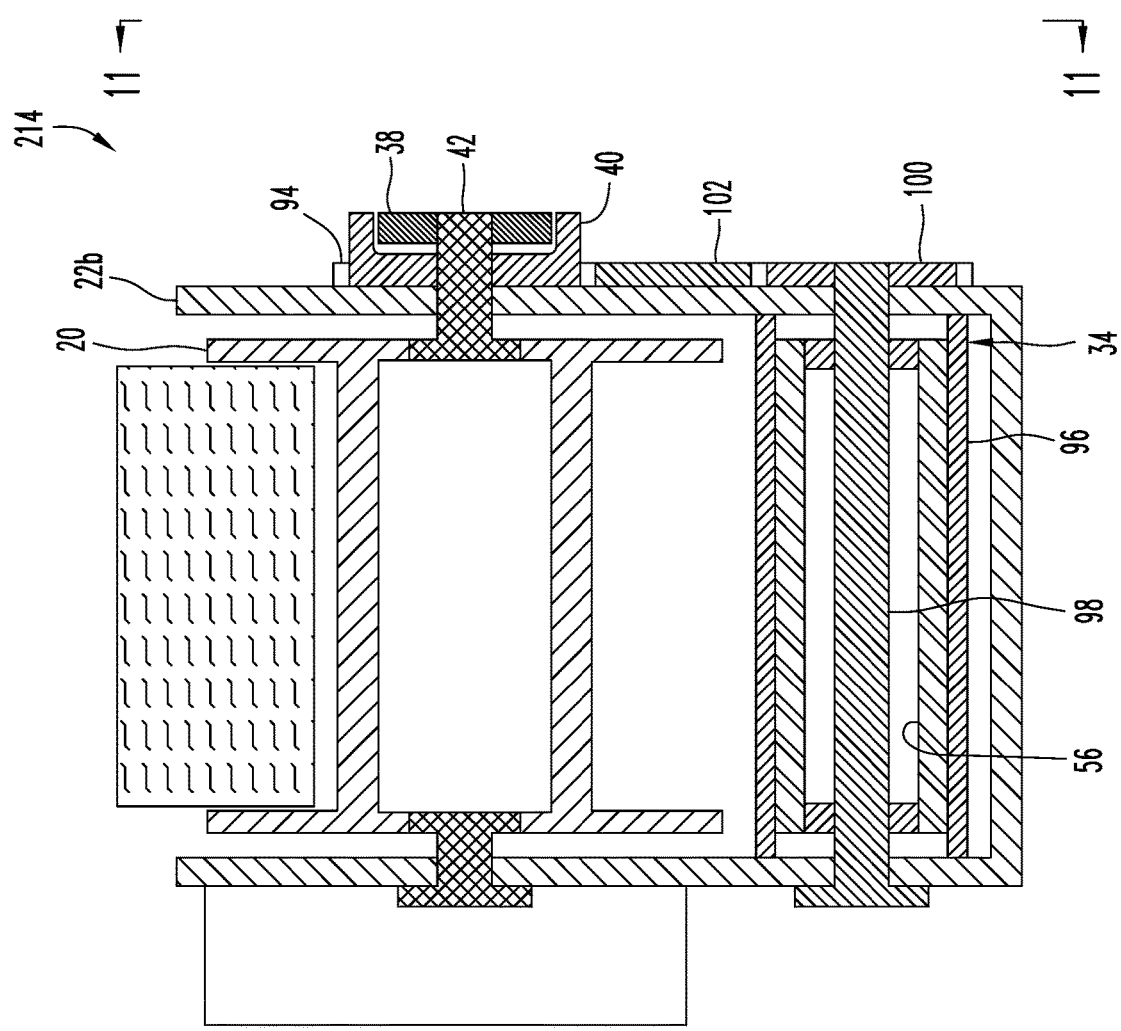
FIG. 10 is a vertical section view similar to FIG. 2 of a third embodiment adaptive load-limiting seatbelt assembly in accordance with this disclosure.
Figure 11:
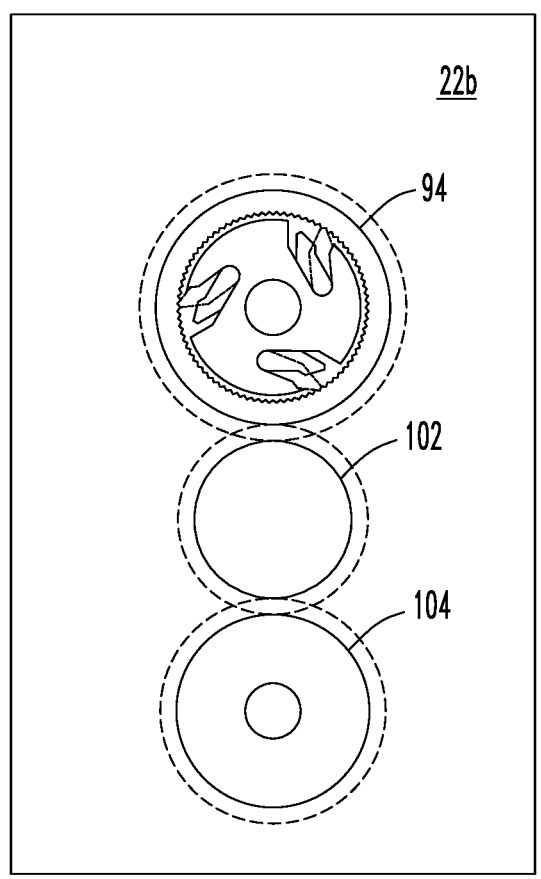
FIG. 11 is a side view of the seatbelt assembly shown in FIG. 10 taken along line 11-11 of FIG. 10.

The seatbelt assemblies 14, 114 have the movable and stationary portions of the TCJ 34 coaxial with the rotational axis of the spool drum 20. FIGS. 10 and 11 illustrate a third embodiment adaptive seatbelt assembly 214 in accordance with this disclosure in which the TCJ 34 is not coaxial with the spool drum 20. Only the differences from the seatbelt assembly 14, 114 will be described. The same reference numbers will be used for the same corresponding elements.

The outer member 40 of the clutch 36 is formed as a portion of a gear 94 rotatably mounted on the frame sidewall 22b and coaxial with the shaft 42 non-rotatably connecting the spool drum 20 to the inner clutch member 38. The shaft 42 can rotate with respect to the gear 94 when the clutch is in the disengaged state.

The TCJ 34 is located below the spool drum 20 as viewed in FIG. 10. The TCJ 34 includes the piezoelectric ring 56 and a tubular member 96. The tubular member is fixedly attached to the sidewalls 22a, 22b. The piezoelectric ring is disposed inside the tubular member and is coaxial with the tubular member.

The piezoelectric ring 56 is non-rotatably mounted on a shaft 98. The shaft 98 is rotatably mounted on the sidewalls 22a, 22b. The shaft 98 extends through the sidewall 22b and mounts a gear 100 non-rotatably connected to the shaft 98. The gear 100 is connected to the gear 94 through an idler gear 102 rotatably mounted on the sidewall 22b. The gears 94, 100, 102 form a gear train wherein rotation of the outer clutch member 40 urges rotation of the piezoelectric ring 56.

The piezoelectric ring 56 and the tubular member 96 generate an initial interference fit when no voltage is applied to the piezoelectric ring during normal operation of the seatbelt assembly 214. The initial interference fit can, for example, be the same as the initial interference fit used in the seatbelt assembly 14.

During normal operation of the seatbelt assembly 214, the clutch 36 is in its disengaged state. An occupant can withdraw seatbelt webbing without resistance from the interference fit generated in the TCJ joint 34.

A dynamic event causes the clutch 36 to switch from the disengaged state to the engaged state as previously described. The spool drum 20 is non-rotatably connected to the piezoelectric ring 56 through the gear train. Occupant force urges the spool drum to rotate in the pay-out direction and urge relative rotation of the piezoelectric ring 56 against the tubular member 96. The interference fit can be controlled by the control system 64 as previously described for controlled pay-out of the seatbelt during the dynamic event.

The seatbelt assemblies 14, 114, 214 have the spool drum 20 non-rotatably connected to the clutch inner member 38 and the movable member of the TCJ 34 non-rotatably connected to the clutch outer member 40 when the clutch 36 is in its engaged state. This enables the spool drum to urge rotation of the movable member relative to the non-moveable member of the TCJ joint when the clutch is in its engaged state after the occurrence of a dynamic event.

Figure 12:
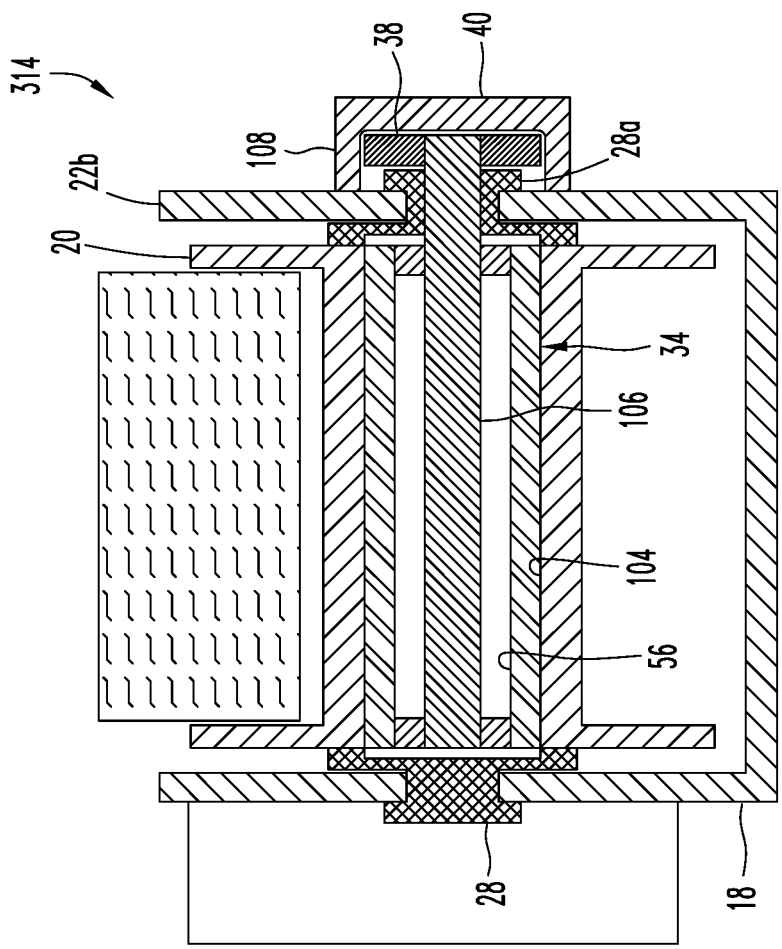
FIG. 12 is a vertical section view similar to FIG. 2 of a fourth embodiment adaptive load-limiting seatbelt assembly in accordance with this disclosure.

FIG. 12 illustrates a fourth embodiment adaptive seatbelt assembly 314 in which a portion of the spool drum 20 forms a movable outer member of the TCJ joint and the piezoelectric ring forms a stationary inner member of the TCJ joint. An interference fit exists between the portion of the spool drum and the piezoelectric ring that resists relative rotation of the spool drum with respect to the piezoelectric ring. The same reference numbers will be used for the same corresponding elements disclosed previously.

During normal operation of the seatbelt with the clutch in the disengaged state, the spool drum and the piezoelectric ring are free to rotate with conjoint rotation and not relative rotation between them to enable the occupant to withdraw seatbelt webbing without resistance from the TCJ joint.

Upon an occurrence of a dynamic event, the clutch switches to its engaged state and non-rotatably connects the piezoelectric ring to the frame of the seatbelt assembly. Occupant force urging rotation of the spool drum in the pay-out direction relative to the piezoelectric ring and frame is now resisted by the interference fit between the spool drum portion and the piezoelectric ring. The controller controls the interference fit to control pay-out of the seatbelt as previously described.

The spool drum 20 includes a through-bore coaxial with the rotational axis of the spool drum. The through-bore is defined by an annular wall 104. The spool drum 20 of the seatbelt assembly 314 is connected to a pair of stub shafts 28, 28a which are rotatably mounted in the frame sidewalls 22a, 22b. The stub shafts are located on opposite sides of the spool drum through-bore. The stub shafts rotatably mount the spool drum in the frame 18 for rotation about the spool drum axis.

The TCJ 34 includes the piezoelectric ring 56 forming the stationary inner TCJ member being disposed inside the annular inner wall 104 defining the spool drum. The piezoelectric ring is mounted on an elongate shaft 106 coaxial with the spool drum rotational axis and rotatable about the rotational axis. The shaft 106 extends through a sleeve bearing formed in the stub shaft 28a to a free end disposed outside of the frame 18. The inner clutch member 38 of the clutch 36 is fixedly mounted on the free end of the shaft 106. The inner clutch member is surrounded by the outer clutch member 40. The outer clutch member 40 is fixedly attached to the sidewall 22b by an integral tubular portion 108 of the outer clutch member whereby the outer clutch member defines a housing fixed to the frame sidewall that receives the free end of the shaft 106.

The TCJ 34 includes as a component the annular wall 104 defining and surrounding through-bore. The piezoelectric ring 56 and the annular wall define an initial interference fit that frictionally attaches together the spool drum 20 onto the piezoelectric ring. The initial interference fit can, for example, be the same as the initial interference fit used in the seatbelt assembly 14.

During normal operation of the seatbelt assembly 314, the clutch 36 is in its disengaged state. The interference fit between the spool drum 20 and the piezoelectric ring 56 is sufficient to prevent relative rotation of the spool drum with respect to the piezoelectric ring caused by normal seatbelt extraction and retraction. The interference fit functions to non-rotatably connect the spool drum and the piezoelectric ring 56 for conjoint rotation of the spool drum, piezoelectric ring, shaft 106, and clutch inner member 38 during normal operation of the seatbelt assembly 314. The occupant can withdraw seatbelt webbing without resistance from the TCJ joint.

Upon an occurrence of a dynamic event, the clutch 36 switches to its engaged state. The clutch 36 now non-rotatably connects the shaft 106 and the spool ring 56 to the frame sidewall 22b. Occupant force urging rotation of the spool drum 20 in the pay-out direction relative to the stationary piezoelectric ring 56 is resisted by the interference fit between the spool drum annular wall 104 and the piezoelectric ring. The controller 64 controls the interference fit to control pay-out of the seatbelt as previously described.

Figure 14:
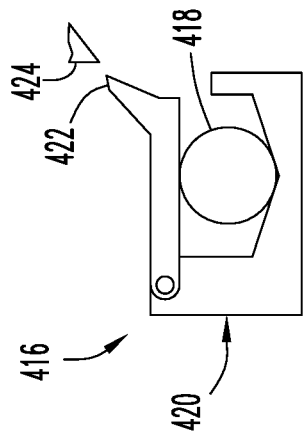
FIG. 14 is an enlarged view of the inertial locking mechanism of the seatbelt assembly shown in FIG. 13.
Figure 13:
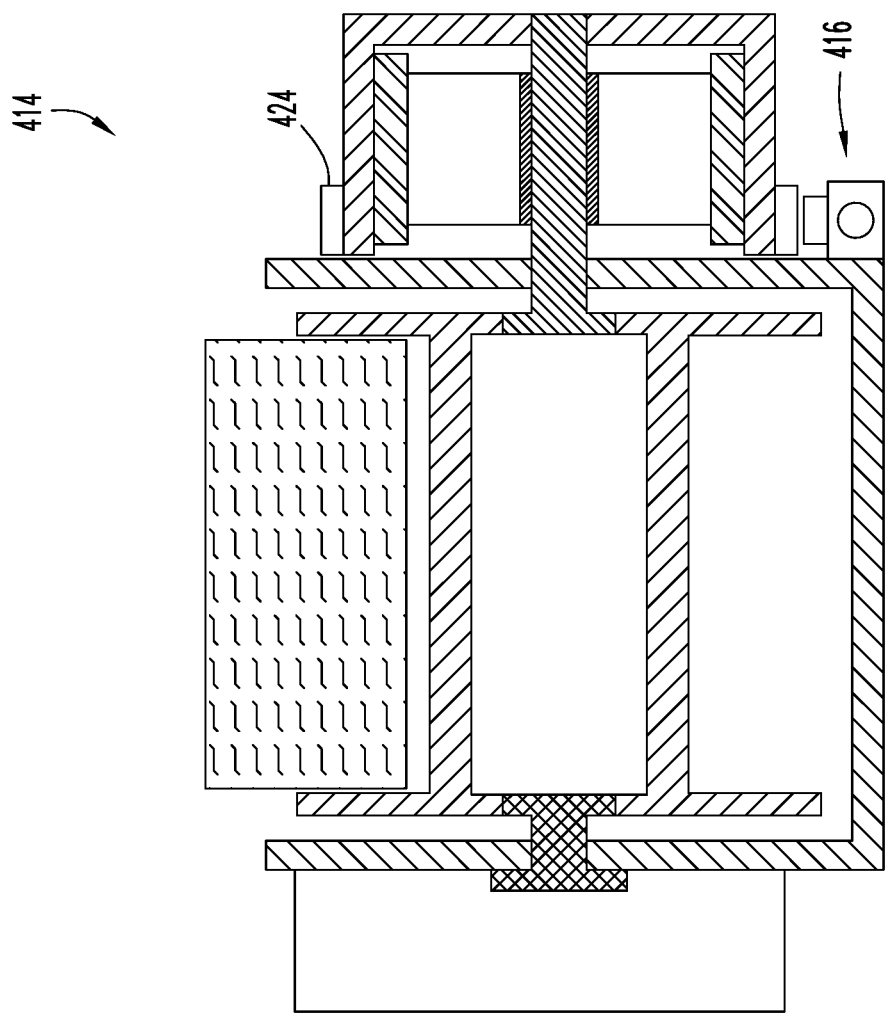
FIG. 13 is a vertical section view of a fifth embodiment adaptive load-limiting seatbelt assembly in accordance with this disclosure.

FIGS. 13 and 14 illustrate a fifth embodiment seatbelt assembly 414. Only differences from the seatbelt assembly 114 will be described. The same reference numbers will be used for the same corresponding elements.

The seatbelt assembly 414 is similar to the seatbelt assembly 114 in that the TCJ rotatable member 56 and stationary member 40 are conjointly rotatable during normal operation of the seatbelt assembly 414. Rather than incorporating a rotary clutch to non-rotatably connect the stationary member 40 to the frame 18, an inertial locking mechanism 416 is used instead. The inertial locking mechanism 416 is configured to switch from a disengaged state to an engaged state upon relative displacement of an inertial actuation member caused by a dynamic event in which vehicle deceleration is above a threshold rate. The inertial actuation member is a ball 418 that actuates a pawl locking device 420 having a pawl 422 to place the mechanism 416 in its engaged state. The pawl 422 engages spaced apart teeth 424 formed on the outside of the stationary member 40 in alignment with the pawl 422. The pawl 422 in engaging a tooth 424 while the spool drum 20 is rotating in the pay-out direction non-rotatably connects the stationary member 40 to the frame 18.

An example of a ball and pawl inertial locking mechanism 416 is disclosed in Kusogi et al. Patent Application Publication 20060237569A1, incorporated by reference as if fully set forth herein and so as known locking mechanism is not described in greater detail.

Figure 15:
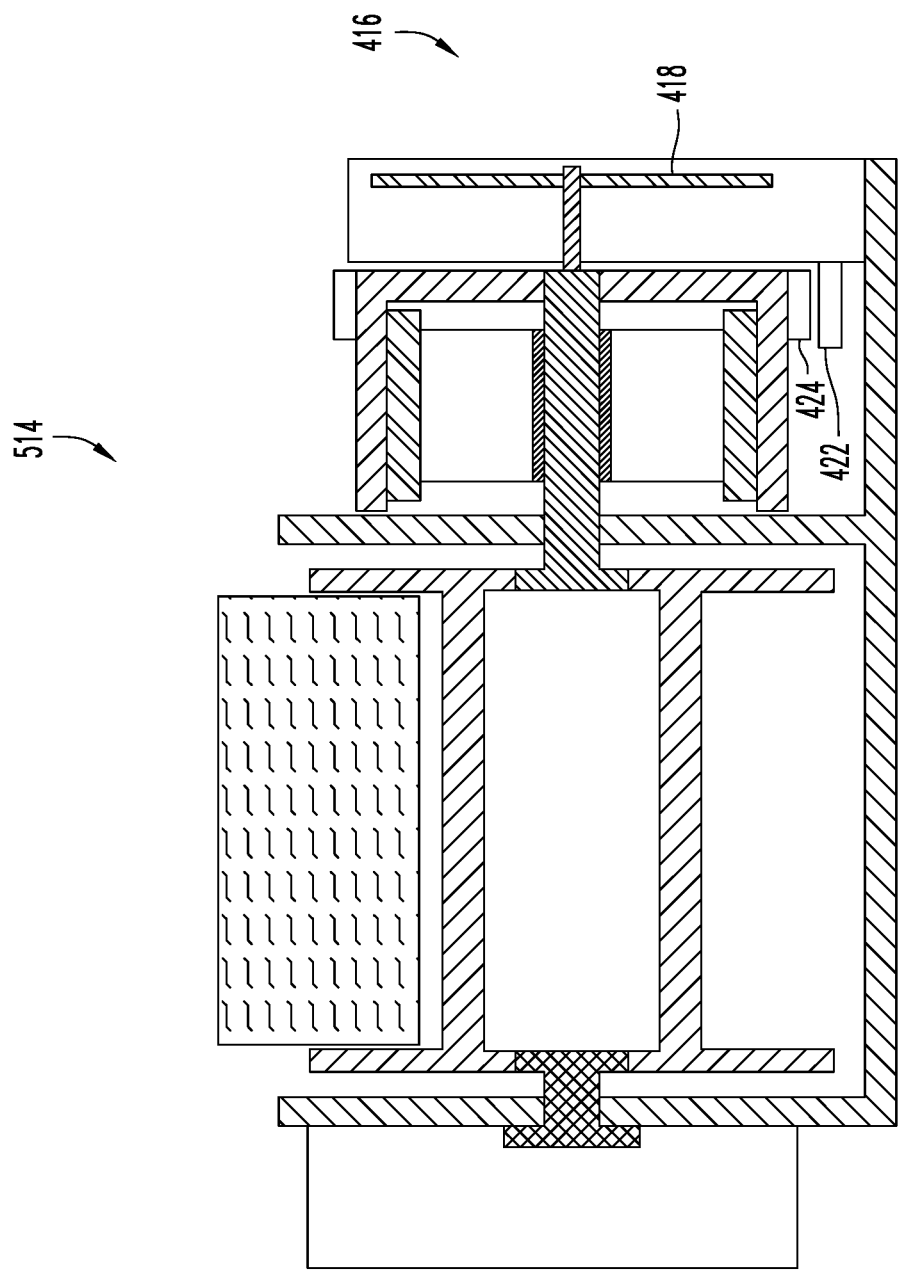
FIG. 15 is a vertical section view of a sixth embodiment adaptive load-limiting seatbelt assembly in accordance with this disclosure.

FIG. 15 illustrates a sixth embodiment seatbelt assembly 514 in accordance with this disclosure. Only differences from the seatbelt assembly 414 will be described. The same reference numbers will be used for the same corresponding elements.

The seatbelt assembly 514 is similar to the seatbelt assembly 414 in that an inertial latching mechanism 416 locks the stationary member 40 of the TCJ 36 to the frame 18 upon initiation of a dynamic event. The inertial latching mechanism 416 of the seatbelt assembly 514, however, utilizes an inertia disk as its inertial actuation member 418. The inertial locking mechanism 416 is configured to switch from a disengaged state to an engaged state upon relative rotation of the inertia disk 418 with respect to the spool drum 20 caused by initiation of the dynamic event. The inertia disk 418 actuates a pawl locking device 420 having a pawl 422 to place the mechanism 416 in its engaged state. The pawl 422 engages spaced apart teeth 424 formed on the outside of the stationary member 40 in alignment with the pawl 422.

Example inertial locking mechanisms 416 utilizing an inertia disk and pawl mechanism is disclosed in Bauer, U.S. Pat. No. 6,216,973, Rumpf U.S. Pat. No. 4,729,525. and Rumpf et al. U.S. Pat. No. 4,895,317, each incorporated by reference as if fully set forth herein and so as known locking mechanism is not described in greater detail.

Figure 16:
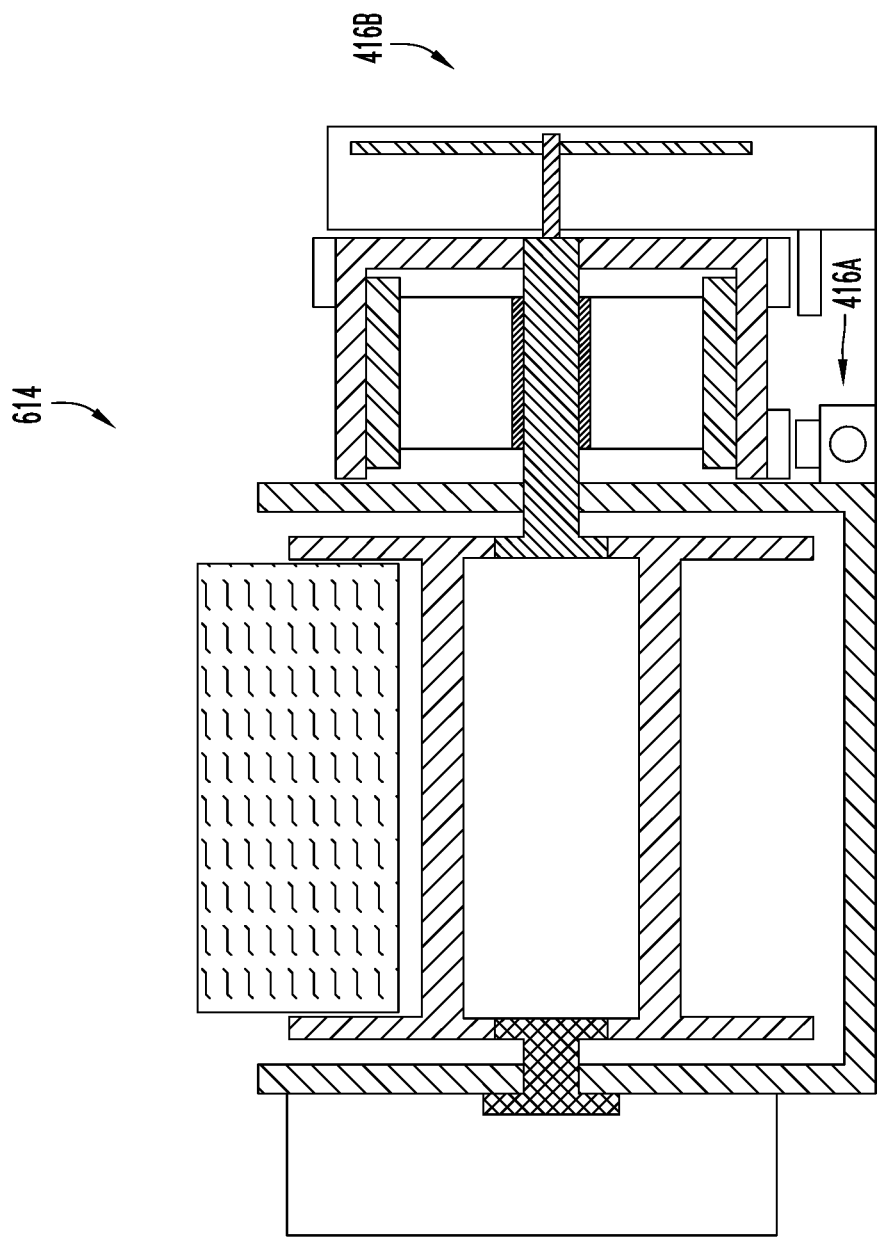
FIG. 16 is a vertical section view of a seventh embodiment adaptive load-limiting seatbelt assembly in accordance with this disclosure.

FIG. 16 illustrates a seventh embodiment seatbelt assembly 614 in accordance with this disclosure. Only differences from the seatbelt assemblies 414 will be described. The same reference numbers will be used for the same corresponding elements.

The seatbelt assembly 614 includes redundant inertial locking mechanisms: a locking mechanism 416A like the ball and pawl locking mechanism 414 of seatbelt assembly 414 and a locking mechanism 416B like the inertia disk and pawl locking mechanism 414 of seatbelt assembly 514. The two locking mechanisms operate independently of one another to lock the TCJ stationary member 40 to the frame 18 in response to a dynamic event.

Figure 17:
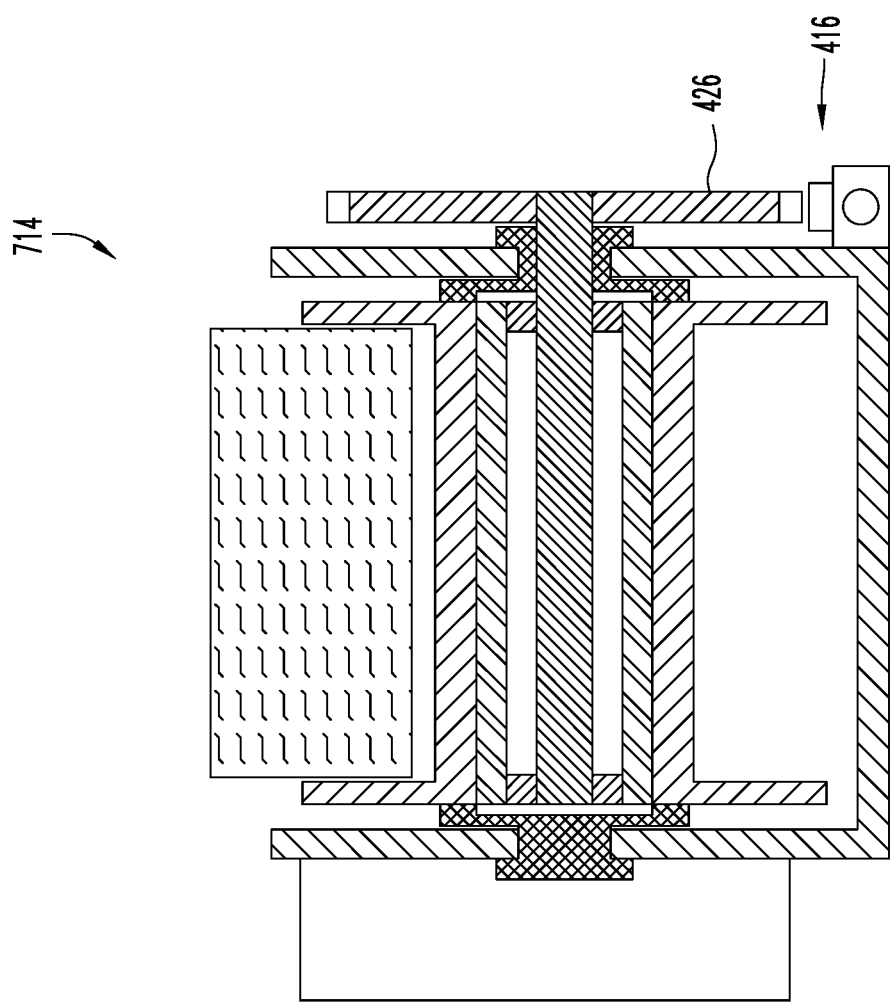
FIG. 17 is a vertical section view of an eighth embodiment adaptive load-limiting seatbelt assembly in accordance with this disclosure.

FIG. 17 illustrates an eighth embodiment seatbelt assembly 714 in accordance with this disclosure. Only differences from the seatbelt assemblies 314 will be described. The same reference numbers will be used for the same corresponding elements.

The seatbelt assembly 714 is similar to the seatbelt assembly 314 in that the spool drum 20 forms the outer, rotatable member of the TCJ 34. Rather than using a rotary clutch to lock the stationary member of the TCJ 34 to the frame 18, the seatbelt assembly 714 utilizes a ball and pawl inertial locking mechanism 416 like the inertial locking mechanism of the seatbelt assembly 414. The inertial locking mechanism includes a circular disk 426 non-rotatably connect to shaft 106 that includes spaced apart outer teeth 424. The pawl of the locking mechanism engages a tooth 424 to lock the TCJ stationary member 56 to the frame 18 in response to a dynamic event.

Features of possible embodiments of a seatbelt assembly in accordance with this disclosure can include:

1. A seatbelt assembly for restraining an occupant of a passenger vehicle during a dynamic event comprising:
a spool drum mounted on a frame and rotatable about a drum axis in a pay-out direction for paying out seatbelt webbing carried on the spool drum, a piezoelectric device, and a one-way rotary clutch;
the piezoelectric device comprising a first member and a second member, the first member being formed of a piezoelectric material, one member of the first member and the second member being a rotatable member rotatably mounted with respect to the frame for rotation about a member axis, the other of the first member and the second member being a fixed member fixed with respect to the frame, the first and second members comprising facing bearing surfaces concentric with the member axis, the bearing surfaces defining an interference fit between the first and second members, the interference fit resisting relative rotation of the one member with respect to the other member about the member axis;
the rotary clutch comprising a first clutch member and a second clutch member, the first clutch member being non-rotatably connected to the spool drum and conjointly rotatable with the spool drum, the second clutch member being non-rotatably connected to the rotatable member of the piezoelectric device and conjointly rotatable with the rotatable member of the piezoelectric device; and
the rotary clutch being switchable from a disengaged state to an engaged state when rotation of the spool drum in the pay-out direction in response to the dynamic event causes the first clutch member to rotate above a threshold rate of rotation or above a threshold rate of angular acceleration whereby the rotary clutch in the engaged state non-rotatably connects the spool drum and the rotatable member of the piezoelectric device.

2. The seatbelt assembly of feature 1 wherein the spool drum and the rotatable member of the piezoelectric device rotate about a common axis of rotation.

3. The seatbelt assembly of feature 2 wherein the spool drum is supported for rotation by and between a pair of spaced apart frame portions, and the rotary clutch and the piezoelectric device are each not disposed between the frame portions.

4. The seatbelt assembly of feature 3 wherein the spool drum is connected to the first clutch member by a first shaft extending through one of the pair of frame portions.

5. The seatbelt assembly of feature 4 wherein the rotatable member of the piezoelectric device is connected to the second clutch member by a second shaft.

6. The seatbelt assembly of feature 5 wherein the fixed member of the piezoelectric device defines a housing attached to the said one of the pair of frame portions, the rotary clutch and the rotatable member of the piezoelectric device being disposed in the housing.

7. The seatbelt assembly of feature 4 wherein the rotatable member of the piezoelectric device defines a housing enclosing the fixed member of the piezoelectric device, a portion of the housing defining the second clutch member whereby the second clutch member is non-rotatably connected to the rotatable member of the piezoelectric device by being an integral portion of said rotatable member of the piezoelectric device.

8. The seatbelt assembly of feature 7 wherein the second clutch member surrounds an opening in the housing, and the first clutch member is disposed in the opening.

9. The seatbelt assembly of feature 8 wherein the fixed member of the piezoelectric device is fixedly attached to the said one of the pair of frame portions by a support member, the fixed member of the piezoelectric device mounted on the support member spaced away from the said one of the pair of frame portions; and the first shaft extends through said support member.

10. The seatbelt assembly of feature 1 wherein the spool drum and the rotatable member of the piezoelectric device do not rotate about a common axis of rotation.

11. The seatbelt assembly of feature 1 wherein the spool drum and the rotatable member of the piezoelectric device are each mounted for rotation by and between a pair of spaced apart frame portions.

12. The seatbelt assembly of feature 11 wherein the fixed portion of the piezoelectric device is disposed between the said pair of frame portions and fixed to said pair of frame portions.

13. The seatbelt assembly of feature 12 wherein the rotatable member of the piezoelectric drive is mounted on a first shaft supported for rotation by the pair of frame members, the first shaft being connected to a gear train non-rotatably connecting the first shaft to the second clutch member.

14. The seatbelt assembly of feature 13 wherein the second clutch member forms a portion of a gear of said gear train.

15. The seatbelt assembly of feature 1 wherein the first member is the rotatable member of the piezoelectric device.

16. The seatbelt assembly of feature 1 wherein the interference fit between the first and second members of the piezoelectric device is sufficient to prevent manual withdrawal of seatbelt webbing from the spool drum by an occupant of the seatbelt assembly if the rotary clutch were in the engaged state and the seatbelt assembly was not experiencing a dynamic event.

17. The seatbelt assembly of feature 1 comprising a control system connected to the piezoelectric device, the control system being configured to control the rate of pay-out of seatbelt webbing by the spool drum during the dynamic event by increasing, decreasing, or maintaining the interference fit between the first and second members of the piezoelectric device.

18. The seatbelt assembly of feature 17 wherein the control system comprises a controller, at least one sensor being configured and disposed to transmit a data signal to the controller representing the speed of pay-out and/or the amount of pay-out of seatbelt webbing from the spool drum, and a variable voltage source, the voltage source being electrically connected to the first member of the piezoelectric device;

the controller being configured to control rate of pay-out of the spool drum during the dynamic event by controlling the voltage applied to the first member of the piezoelectric device by the variable voltage source in response to the data signal being received by the controller to thereby control the interference fit between the first and second members of the piezoelectric device to control the rate of rotation of the spool drum during the dynamic event.

19. The seatbelt assembly of feature 1 wherein the rotary clutch comprises pawls pivotally mounted on the first clutch member that engage the second clutch member to thereby form the non-rotatable connection between the first and second clutch members when the rotary clutch is in the engaged state.

20. A seatbelt assembly for restraining an occupant of a passenger vehicle during a dynamic event comprising:

a spool drum mounted on a frame and rotatable about a drum axis in a pay-out direction for paying out seatbelt webbing carried on the spool drum, a piezoelectric device, and a one-way rotary clutch;

the spool drum comprising an annular wall extending axially along the drum axis and surrounding the drum axis;

the piezoelectric device comprising a first member and a second member, the first member being a portion of the spool drum comprising the annular wall of the spool drum, the second member being disposed inside the annular wall of the spool drum and rotatably mounted on the frame for rotation about the drum axis;

the annular wall of the spool drum defining a first bearing surface, the second member of the piezoelectric device comprising a second bearing surface facing the first bearing surface of the spool drum, the first and second bearing surfaces being facing surfaces concentric with the drum axis and defining an interference fit between them resisting relative rotation of the spool drum with respect to the second member about the drum axis;

one of the first and second bearing surfaces being a surface of a body of the piezoelectric device formed of a piezoelectric material;

the interference fit non-rotatably connecting the spool drum and the second member of the piezoelectric device during normal operation of the seatbelt assembly outside of a dynamic event, the interference fit thereby enabling conjoint rotation of the spool drum the second member about the drum axis whereby an occupant of the seatbelt assembly can extract and retract seatbelt webbing from the spool drum without having to overcome resistance from the interference fit during normal operation of the seatbelt assembly;

the rotary clutch comprising a first clutch member and a second clutch member, the first clutch member being non-rotatably connected to the second member of the piezoelectric device and conjointly rotatable with the second member of the piezoelectric device, the second clutch member being non-rotatably connected to the frame and fixed relative to the frame; and the rotary clutch being switchable from a disengaged state to an engaged state when rotation of the spool drum in the pay-out direction in response to the dynamic event causes the first clutch member to rotate above a threshold rate of rotation or above a threshold rate of angular acceleration, the rotary clutch in the engaged state non-rotatably connecting the second member of the piezoelectric device to the frame whereby relative rotation of the spool drum with respect to the second member of the piezoelectric device is resisted by the interference fit.

21. The seatbelt assembly of feature 20 wherein the second member of the piezoelectric device is the body formed of a piezoelectric material.

22. The seatbelt assembly of feature 20 wherein the spool drum comprises a portion that is the body of the piezoelectric device formed of piezoelectric material.

23. The seatbelt assembly of feature 20 wherein the spool drum is supported for rotation by and between a pair of spaced apart frame portions;

the second member of the piezoelectric device is attached to a shaft that is supported for rotation about the drum axis by and between the pair of frame portions; and the shaft extends through one of the pair of frame portions to the first clutch member, the first clutch member mounted on the shaft.

24. The seatbelt assembly of feature 23 wherein the second clutch member is formed as a housing fixed to the said one of the pair of frame portions, the housing enclosing the first clutch member.

25. The seatbelt assembly of feature 20 wherein the interference fit of the piezoelectric device is sufficient to prevent manual withdrawal of seatbelt webbing from the spool drum by an occupant of the seatbelt assembly if the rotary clutch were in the engaged state and the seatbelt assembly was not experiencing a dynamic event.

26. The seatbelt assembly of feature 20 comprising a control system connected to the piezoelectric device, the control system being configured to control the rate of pay-out of seatbelt webbing by the spool drum during the dynamic event by increasing, decreasing, or maintaining the interference fit between the first and second members of the piezoelectric device.

27. The seatbelt assembly of feature 26 wherein the control system comprises a controller, at least one sensor being configured and disposed to transmit a data signal to the controller representing the speed of pay-out and/or the amount of pay-out of seatbelt webbing from the spool drum, and a variable voltage source, the voltage source being electrically connected to the first member of the piezoelectric device;

the controller being configured to control rate of pay-out of the spool drum during the dynamic event by controlling the voltage applied to the piezoelectric body of the piezoelectric device by the variable voltage source in response to the data signal being received by the controller to thereby control the interference fit between the first and second members of the piezoelectric device to control the rate of rotation of the spool drum during the dynamic event.

28. The seatbelt assembly of feature 20 wherein the rotary clutch comprises pawls pivotally mounted on the first clutch member that engage the second clutch member to thereby form the non-rotatable connection between the first and second clutch members when the rotary clutch is in the engaged state.

Examples of known seatbelt assemblies that disclose pretensioners, locking devices, and other seatbelt assembly components that can be adapted for use with the disclosed adaptive load-limiting seatbelt assembly include those disclosed in, for example, Miller, III et al. U.S. Pat. No. 5,547,143, Clute U.S. Pat. No. 7,318,560, Hiramatsu U.S. Pat. No. 7,392,957, Boelstler et al. U.S. Pat. No. 7,669,794, Clute U.S. Pat. No. 7,806,357, Gray U.S. Pat. No. 10,399,540, Clute US Patent Application Publication 2006/0082127, Lenning US Patent Application Publication 2007/0228204, Hiramatsu et al. US Patent Application Publication 2009/0057470, Schlaps et al. US Patent Application Publication 2020/0216016, and Jaradi et al. US Patent Application Publication 2020/0307507, each of which are incorporated by reference as if fully set forth herein.

While this disclosure includes one or more illustrative embodiments described in detail, it is understood that the one or more embodiments are each capable of modification and that the scope of this disclosure is not limited to the precise details set forth herein but include such modifications that would be obvious to a person of ordinary skill in the relevant art including (but not limited to) changes in material selection, size, operating ranges, environment of use, use and implementation of redundant locking mechanisms, configuration and stiffness, drive arrangements between the spool drum and the relatively movable TCJ components, rotary clutch or inertial locking assembly designs, and use and implementation of a pretensioner and/or locking mechanism, as well as such changes and alterations that fall within the purview of the following claims.

What is claimed is:

1. A seatbelt assembly for restraining an occupant of a passenger vehicle during a dynamic event comprising:
    a spool drum mounted on a frame and rotatable with respect to the frame about a drum axis in a pay-out direction for paying out seatbelt webbing carried on the spool drum, a friction device, and a rotary clutch;
    the friction device comprising a first friction member and a second friction member, the first friction member, the second friction member, and the spool drum being separate bodies from one another;
    the first and second friction members being disposed about a common axis of the friction device, the first friction member being rotatable with respect to the second friction member about the said common axis of the friction device, the second friction member being a fixed member with respect to the frame, the first and second friction members comprising facing bearing surfaces concentric with the friction device axis, the bearing surfaces defining an interference fit between the first and second friction members, the interference fit generating friction resisting relative rotation of the first friction member with respect to the second friction member when the first friction member is being urged to rotate relative to the second friction member;
    the rotary clutch comprising a first clutch member and a second clutch member, the first clutch member being non-rotatably connected to the spool drum and conjointly rotatable with the spool drum, the second clutch member being non-rotatably connected to the first friction member; and
    the rotary clutch being switchable from a disengaged state to an engaged state, the spool drum being capable of rotating in the pay-out direction independently of the friction device when the rotary clutch is in the disengaged state, the rotary clutch switching from the disengaged state to the engaged state when rotation of the spool drum in the pay-out direction in response to the dynamic event causes the first clutch member to rotate above a threshold rate of rotation or above a threshold rate of angular acceleration wherein the rotary clutch in the engaged state non-rotatably connects the spool drum and the first friction member and rotation of the spool drum in the payout direction is resisted by the friction generated by the friction device.

2. The seatbelt assembly of claim 1 wherein the bearing surface of one of the first and second friction members is a piezoelectric material; and
    the seatbelt assembly further comprises a control system connected to the piezoelectric material, the control system being configured to apply a voltage to the piezoelectric material to at least partially generate the interference fit between the first and second friction members.

3. The seatbelt assembly of claim 2 wherein the control system is configured to control the rate of pay-out of seatbelt webbing by the spool drum during a dynamic event by increasing, decreasing, or maintaining the interference fit between the first and second friction members of the friction device.

4. The seatbelt assembly of claim 1 wherein the interference fit of the friction device remains constant before and during a dynamic event.

5. The seatbelt assembly of claim 1 wherein the drum axis and the friction device axis are coaxial with one another.

6. The seatbelt assembly of claim 1 wherein the drum axis and the friction device axis are not coaxial with one another, the seatbelt assembly further comprising a transmission connecting the second clutch member and the first friction member that transmits torque applied to the transmission by the second clutch member to the first friction member.

7. The seatbelt assembly of claim 6 wherein the transmission comprises at least one gear rotatably mounted on the frame.

8. The seatbelt assembly of claim 1 wherein one of the first and second friction members defines a housing enclosing the other of the first and second friction members.

9. The seatbelt assembly of claim 8 wherein the housing is fixedly attached to the frame.

10. A seatbelt assembly for restraining an occupant of a passenger vehicle during a dynamic event, the seatbelt assembly capable of normal operation outside of the dynamic event to enable a user to extract or retract seatbelt webbing, the seatbelt assembly comprising:
    a spool drum rotatably mounted on a frame with respect to the frame, the spool drum being rotatable about a drum axis in a pay-out direction for paying out seatbelt webbing carried on the spool drum, a friction device, and a locking mechanism being operatively disposed between the frame and the friction device;
    the friction device being rotatably mounted on the frame for rotation about a friction device axis, the friction device comprising an outer bearing surface surrounding an inner bearing surface, the inner and outer bearing surfaces being rotatable relative to each other about the friction device axis, the inner and outer bearing surfaces defining an interference fit therebetween, the interference fit capable of generating friction resisting relative rotation of the inner and outer bearing surfaces with respect to each other;
    the spool drum being non-rotatably connected to one of the inner and outer bearing surfaces wherein whenever when the spool drum is urged to rotate in the pay-out direction, the spool drum urges rotation of the one bearing surface relative to the other bearing surface, the interference fit being sufficient to prevent relative rotation of the inner and outer bearing surfaces with respect to each other during normal operation of the seatbelt assembly;

the locking mechanism being switchable from a disengaged state to an engaged state, the locking mechanism being in the disengaged state during normal operation of the seatbelt assembly wherein the spool drum and the friction device rotate conjointly independently of the locking mechanism, the locking mechanism being configured to switch from the disengaged state to the engaged state in response to a dynamic event wherein the locking mechanism in the engaged state non-rotatably connects the other bearing surface to the frame whereby rotation of the spool drum during the dynamic event is resisted by the friction generated by the friction device.

11. The seatbelt assembly of claim 10 wherein one of the inner and outer bearing surfaces is a piezoelectric material, and the seatbelt assembly further comprises a control system connected to the piezoelectric material, the control system being configured to apply a voltage to the piezoelectric material to at least partially generate the interference fit between the inner and outer bearing surfaces.

12. The seatbelt assembly of claim 11 wherein the control system is configured to control the rate of pay-out of seatbelt webbing by the spool drum during a dynamic event by increasing, decreasing, or maintaining the interference fit between the inner and outer bearing surfaces.

13. The seatbelt assembly of claim 10 wherein the interference fit between the inner and outer bearing surfaces remains constant before and during a dynamic event.

14. The seatbelt assembly of claim 10 wherein the spool drum comprises an inner surface forming the one bearing surface of the friction device, the spool drum being mounted on a member of the friction device comprising the other bearing surface of the friction device.

15. The seatbelt assembly of claim 14 wherein the locking mechanism is a rotary clutch, the rotary clutch comprising a first clutch member and a second clutch member, the first clutch member being non-rotatably connected to the member of the friction device and conjointly rotatable with the member, and the second clutch member being non-rotatably connected to the frame; and the rotary clutch switching from the disengaged state to the engaged state when rotation of the spool drum in the pay-out direction in response to the dynamic event causes the first clutch member to rotate above a threshold rate of rotation or above a threshold rate of angular acceleration wherein the rotary clutch in the engaged state non-rotatably connects the member of the friction device and the frame whereby rotation of the spool drum in the payout direction is resisted by the friction generated by the friction device.

16. The seatbelt assembly of claim 14 wherein the locking mechanism is an inertial latching mechanism, the inertial latching mechanism comprising a first latching member, a second latching member, and an inertia member being relatively movable with respect to the frame, the first latching member being non-rotatably connected to the member of the friction device and conjointly rotatable with the member, and the second latching member being connected to the frame;

the inertial latching mechanism switching from the disengaged state to the engaged state by motion of the inertia member relative to the frame caused by the deceleration event, the inertial latching mechanism in the engaged state non-rotatably connecting the member of the friction device and the frame whereby rotation of the spool drum in the payout direction is resisted by the friction generated by the friction device.

17. The seatbelt assembly of claim 16 wherein the first member of the inertial latching mechanism comprises a plurality of teeth, the second member of the inertial latching member comprises a pawl pivotally mounted on the frame, and the inertia member comprises a ball or an inertia disk, whereby relative motion of the inertia member relative to the frame caused by the deceleration event causes the inertia member to urge the pawl into engagement against one or more teeth of the plurality of teeth and thereby non-rotatably connecting the plurality of teeth to the frame.

18. The seatbelt assembly of claim 10 wherein the outer bearing surface is disposed on a housing enclosing the inner bearing surface.

19. The seatbelt assembly of claim 10 wherein the friction device comprises a first friction member and a second friction member, the outer bearing surface being disposed on the first friction member, the inner bearing surface being disposed on the second friction member, and the first friction member, the second friction member, and the spool drum being separate bodies from one another.

20. The seatbelt assembly of claim 19 wherein the friction member or the second friction member that is not attached to the spool drum is a driven friction member of the friction device;

the locking mechanism is an inertial latching mechanism, the inertial latching mechanism comprising a first latching member, a second latching member, and an inertia member being relatively movable with respect to the frame, the first latching member being non-rotatably connected to the driven friction member and conjointly rotatable with the driven friction member, the second latching member being connected to the frame;

the inertial latching mechanism switching from the disengaged state to the engaged state by motion of the inertia member relative to the frame caused by the deceleration event, the inertial latching mechanism in the engaged state non-rotatably connecting the driven member and the frame whereby rotation of the spool drum in the payout direction is resisted by the friction generated by the friction device.

21. The seatbelt assembly of claim 20 wherein the first latching member of the inertial latching mechanism comprises a plurality of teeth, the second latching member of the inertial latching member comprises a pawl pivotally mounted on the frame, and the inertia member comprises a ball or an inertia disk, whereby relative motion of the inertia member relative to the frame caused by the deceleration event causes the inertia member to urge the pawl into engagement against one or more teeth of the plurality of teeth and thereby non-rotatably connecting the plurality of teeth to the frame.

* * * * *